(12) United States Patent
Venugopal et al.

(10) Patent No.: US 12,445,187 B1
(45) Date of Patent: Oct. 14, 2025

(54) BEAM MANAGEMENT PROCEDURE THAT SUPPORTS MULTIPLE INPUT MULTIPLE OUTPUT TRANSMISSIONS

(71) Applicant: QUALCOMM Incorporated, San Diego, CA (US)

(72) Inventors: Kiran Venugopal, Green Brook, NJ (US); Jing Sun, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 18/636,986

(22) Filed: Apr. 16, 2024

(51) Int. Cl.
*H04B 7/0413* (2017.01)
*H04B 7/06* (2006.01)
*H04L 5/00* (2006.01)

(52) U.S. Cl.
CPC ......... *H04B 7/0696* (2023.05); *H04B 7/0413* (2013.01); *H04L 5/005* (2013.01)

(58) Field of Classification Search
CPC ...... H04B 7/0696; H04B 7/0413; H04L 5/005
See application file for complete search history.

(56) References Cited

U.S. PATENT DOCUMENTS

2022/0045810 A1\* 2/2022 Yang ...................... H04L 5/001

\* cited by examiner

*Primary Examiner* — Rahel Guarino
(74) *Attorney, Agent, or Firm* — Holland & Hart LLP

(57) ABSTRACT

Methods, systems, and devices for wireless communication are described. The user equipment (UE) may receive a first configuration indicating a first resource set corresponding to a first set of transmit beams and a second resource set corresponding to a second set of transmit beams and a second configuration indicating a third resource set. The UE may receive reference signals using the first resource set and a first set of receive beams and reference signals using the second resource set and a second set of receive beams. The UE may transmit a first report indicating a first beam pair and a second beam pair and receive a third set of reference signals using the first receive beam, the second receive beam, and the third resource set. The UE may transmit a second report comprising a parameter indicative of a correlation between the first beam pair and the second beam pair.

30 Claims, 15 Drawing Sheets

BEAM MANAGEMENT PROCEDURE THAT SUPPORTS MULTIPLE INPUT MULTIPLE OUTPUT TRANSMISSIONS

FIELD OF TECHNOLOGY

The following relates to wireless communication, including a beam management procedure that supports multiple input multiple output (MIMO) transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some examples, a UE and a network entity may support multiple input multiple output (MIMO). MIMO may allow the UE and the network entity to exchange multiple streams of data using overlapping resources.

SUMMARY

The described techniques relate to improved methods, systems, devices, and apparatuses that support a beam management procedure that supports multiple input multiple output (MIMO) transmissions. The method may include a user equipment (UE) receiving signaling indicating a first configuration and a second configuration. The first configuration may indicate a first resource set that corresponds to a first set of transmit beams and a second resource set that corresponds to a second set of transmit beams, and the second configuration may indicate a third resource set. The UE may receive a first set of reference signals using the first resource set and a first set of receive beams and a second set of reference signals using the second resource set and a second set of receive beams.

The UE may transmit a first report indicating a first beam pair and a second beam pair. The first beam pair may include a first transmit beam of the first set of transmit beams and a first receive beam of the first set of receive beams and the second beam pair may include a second transmit beam of the second set of transmit beams and a second receive beam of the second set of receive beams. The UE may receive a third set of reference signals using the first receive beam, the second receive beam, and the third resource set and transmit a second report that includes a parameter indicative of a correlation between the first beam pair and the second beam pair.

A method for wireless communications by a UE is described. The method may include receiving first signaling indicating a set of multiple configurations including a first configuration and a second configuration, the first configuration indicating a first resource set that corresponds to a first set of multiple transmit beams associated with a network entity and a second resource set that corresponds to a second set of multiple transmit beams associated with the network entity, and the second configuration indicating a third resource set, receiving, based on the first configuration, a first set of multiple reference signals using the first resource set and a first set of multiple receive beams associated with the UE, receiving, based on the first configuration, a second set of multiple reference signals using the second resource set and a second set of multiple receive beams, transmitting a first report indicating a first beam pair and a second beam pair, the first beam pair including a first transmit beam of the first set of multiple transmit beams and a first receive beam of the first set of multiple receive beams and the second beam pair including a second transmit beam of the second set of multiple transmit beams and a second receive beam of the second set of multiple receive beams, receiving, based on the first report, a third set of multiple reference signals using the first receive beam, the second receive beam, and the third resource set, and transmitting a second report including a parameter indicative of a correlation between the first beam pair and the second beam pair, the parameter based on the first report and the third set of multiple reference signals.

A UE for wireless communications is described. The UE may include one or more memories storing processor executable code, and one or more processors coupled with the one or more memories. The one or more processors may individually or collectively be operable to execute the code to cause the UE to receive first signaling indicating a set of multiple configurations including a first configuration and a second configuration, the first configuration indicating a first resource set that corresponds to a first set of multiple transmit beams associated with a network entity and a second resource set that corresponds to a second set of multiple transmit beams associated with the network entity, and the second configuration indicating a third resource set, receive, based on the first configuration, a first set of multiple reference signals using the first resource set and a first set of multiple receive beams associated with the UE, receive, based on the first configuration, a second set of multiple reference signals using the second resource set and a second set of multiple receive beams, transmit a first report indicating a first beam pair and a second beam pair, the first beam pair including a first transmit beam of the first set of multiple transmit beams and a first receive beam of the first set of multiple receive beams and the second beam pair including a second transmit beam of the second set of multiple transmit beams and a second receive beam of the second set of multiple receive beams, receive, based on the first report, a third set of multiple reference signals using the first receive beam, the second receive beam, and the third resource set, and transmit a second report including a parameter indicative of a correlation between the first beam pair and the second beam pair, the parameter based on the first report and the third set of multiple reference signals.

Another UE for wireless communications is described. The UE may include means for receiving first signaling indicating a set of multiple configurations including a first configuration and a second configuration, the first configuration indicating a first resource set that corresponds to a first set of multiple transmit beams associated with a network entity and a second resource set that corresponds to a second set of multiple transmit beams associated with the network entity, and the second configuration indicating a third resource set, means for receiving, based on the first configuration, a first set of multiple reference signals using the first resource set and a first set of multiple receive beams associated with the UE, means for receiving, based on the first configuration, a second set of multiple reference signals using the second resource set and a second set of multiple receive beams, means for transmitting a first report indicating a first beam pair and a second beam pair, the first beam pair including a first transmit beam of the first set of multiple transmit beams and a first receive beam of the first set of multiple receive beams and the second beam pair including a second transmit beam of the second set of multiple transmit beams and a second receive beam of the second set of multiple receive beams, means for receiving, based on the first report, a third set of multiple reference signals using the first receive beam, the second receive beam, and the third resource set, and means for transmitting a second report including a parameter indicative of a correlation between the first beam pair and the second beam pair, the parameter based on the first report and the third set of multiple reference signals.

A non-transitory computer-readable medium storing code for wireless communications is described. The code may include instructions executable by one or more processors to receive first signaling indicating a set of multiple configurations including a first configuration and a second configuration, the first configuration indicating a first resource set that corresponds to a first set of multiple transmit beams associated with a network entity and a second resource set that corresponds to a second set of multiple transmit beams associated with the network entity, and the second configuration indicating a third resource set, receive, based on the first configuration, a first set of multiple reference signals using the first resource set and a first set of multiple receive beams associated with the UE, receive, based on the first configuration, a second set of multiple reference signals using the second resource set and a second set of multiple receive beams, transmit a first report indicating a first beam pair and a second beam pair, the first beam pair including a first transmit beam of the first set of multiple transmit beams and a first receive beam of the first set of multiple receive beams and the second beam pair including a second transmit beam of the second set of multiple transmit beams and a second receive beam of the second set of multiple receive beams, receive, based on the first report, a third set of multiple reference signals using the first receive beam, the second receive beam, and the third resource set, and transmit a second report including a parameter indicative of a correlation between the first beam pair and the second beam pair, the parameter based on the first report and the third set of multiple reference signals.

Some examples of the method, UEs, and non-transitory computer-readable medium described herein may further include operations, features, means, or instructions for receiving, based on the first report, second signaling indicating one or more values associated with the third resource set, where receiving the third set of multiple reference signals may be based on the one or more values.

In some examples of the method, UEs, and non-transitory computer-readable medium described herein, the one or more values include one or more transmission configuration indication (TCI) states, a signal to noise ratio (SNR) value that may be based on the first report, a number of data streams that may be based on the first report, or a combination thereof.

Some examples of the method, UEs, and non-transitory computer-readable medium described herein may further include operations, features, means, or instructions for measuring an effective channel between the UE and the network entity based on the first report and the third set of multiple reference signals and determining the parameter based on the effective channel measurement, the SNR value, and the number of data streams.

Some examples of the method, UEs, and non-transitory computer-readable medium described herein may further include operations, features, means, or instructions for receiving, based on the second report, second signaling indicating for the UE to utilize the first beam pair and the second beam pair for MIMO communications between the UE and the network entity.

In some examples of the method, user equipment UEs, and non-transitory computer-readable medium described herein, the second signaling may be included in DCI. In some examples of the method, UEs, and non-transitory computer-readable medium described herein, the second configuration further includes a fourth resource set.

In some examples of the method, UEs, and non-transitory computer-readable medium described herein, the first report further indicates a third beam pair, the third beam pair comprising a third transmit beam of a third plurality of transmit beams and a third receive beam of a third plurality of receive beams, and the method, apparatuses, and non-transitory computer-readable medium may include further operations, features, means, or instructions for receiving, based on the first report, a fourth set of multiple reference signals using the third receive beam, the fourth resource set, and one of the first receive beam or the second receive beam.

In some examples of the method, UEs, and non-transitory computer-readable medium described herein, the first report further indicates a third beam pair and a fourth beam pair, the third beam pair comprising a third transmit beam of the first plurality of transmit beams and a third receive beam of the first plurality of receive beams and the fourth beam pair comprising a fourth transmit beam of the second plurality of transmit beams and a fourth receive beam of the second plurality of receive beams, and the method, apparatuses, and non-transitory computer-readable medium may include further operations, features, means, or instructions for receiving, based on the first report, a fourth set of multiple reference signals using the third receive beam, the fourth receive beam, and the fourth resource set, where the second report further includes a second parameter indicative of a correlation between the third beam pair and the fourth beam pair, the second parameter based on the first report and the fourth set of multiple reference signals.

In some examples of the method, UEs, and non-transitory computer-readable medium described herein, the second configuration includes a periodicity associated with the third resource set and the first report further indicates a third beam pair, the third beam pair including a third transmit beam of a third set of multiple transmit beams and a third receive beam of a third set of multiple receive beams.

In some examples of the method, UEs, and non-transitory computer-readable medium described herein, the UE receives the third set of multiple reference signals during a first periodic occasion of the third resource set according to the periodicity and the method, apparatuses, and non-transitory computer-readable medium may include further operations, features, means, or instructions for receiving a fourth set of multiple reference signals using the third receive beam and one of the first receive beam or the second receive beam during a second periodic occasion of the third resource set according to the periodicity.

In some examples of the method, UEs, and non-transitory computer-readable medium described herein, the network entity includes a first antenna panel configured to use the first set of multiple transmit beams and a second antenna panel configured to use the second set of multiple transmit beams and the user equipment includes a third antenna panel configured to use the first set of multiple receive beams and a fourth antenna panel configured to use the second set of multiple receive beams.

A method for wireless communications by a network entity is described. The method may include transmitting first signaling indicating a set of multiple configurations including a first configuration and a second configuration, the first configuration indicating a first resource set that corresponds to a first set of multiple transmit beams associated with the network entity and a second resource set that corresponds to a second set of multiple transmit beams associated with the network entity and the second configuration indicating a third resource set, transmitting, based on the first configuration, a first set of multiple reference signals using the first resource set and the first set of multiple transmit beams, transmitting, based on the first configuration, a second set of multiple reference signals using the second resource set and the second set of multiple transmit beams, receiving a first report indicating a first beam pair and a second beam pair, the first beam pair including a first transmit beam of the first set of multiple transmit beams and a first receive beam of a first set of multiple receive beams associated with a UE and the second beam pair including a second transmit beam of the second set of multiple transmit beams and a second receive beam of a second set of multiple receive beams associated with the UE, transmitting, based on the first report, a third set of multiple reference signals using the first transmit beam, the second transmit beam, and the third resource set, and receiving a second report including a parameter indicative of a correlation between the first beam pair and the second beam pair, the parameter based on the first report and the third set of multiple reference signals.

A network entity for wireless communications is described. The network entity may include one or more memories storing processor executable code, and one or more processors coupled with the one or more memories. The one or more processors may individually or collectively be operable to execute the code to cause the network entity to transmit first signaling indicating a set of multiple configurations including a first configuration and a second configuration, the first configuration indicating a first resource set that corresponds to a first set of multiple transmit beams associated with the network entity and a second resource set that corresponds to a second set of multiple transmit beams associated with the network entity and the second configuration indicating a third resource set, transmit, based on the first configuration, a first set of multiple reference signals using the first resource set and the first set of multiple transmit beams, transmit, based on the first configuration, a second set of multiple reference signals using the second resource set and the second set of multiple transmit beams, receive a first report indicating a first beam pair and a second beam pair, the first beam pair including a first transmit beam of the first set of multiple transmit beams and a first receive beam of a first set of multiple receive beams associated with a UE and the second beam pair including a second transmit beam of the second set of multiple transmit beams and a second receive beam of a second set of multiple receive beams associated with the UE, transmit, based on the first report, a third set of multiple reference signals using the first transmit beam, the second transmit beam, and the third resource set, and receive a second report including a parameter indicative of a correlation between the first beam pair and the second beam pair, the parameter based on the first report and the third set of multiple reference signals.

Another network entity for wireless communications is described. The network entity may include means for transmitting first signaling indicating a set of multiple configurations including a first configuration and a second configuration, the first configuration indicating a first resource set that corresponds to a first set of multiple transmit beams associated with the network entity and a second resource set that corresponds to a second set of multiple transmit beams associated with the network entity and the second configuration indicating a third resource set, means for transmitting, based on the first configuration, a first set of multiple reference signals using the first resource set and the first set of multiple transmit beams, means for transmitting, based on the first configuration, a second set of multiple reference signals using the second resource set and the second set of multiple transmit beams, means for receiving a first report indicating a first beam pair and a second beam pair, the first beam pair including a first transmit beam of the first set of multiple transmit beams and a first receive beam of a first set of multiple receive beams associated with a UE and the second beam pair including a second transmit beam of the second set of multiple transmit beams and a second receive beam of a second set of multiple receive beams associated with the UE, means for transmitting, based on the first report, a third set of multiple reference signals using the first transmit beam, the second transmit beam, and the third resource set, and means for receiving a second report including a parameter indicative of a correlation between the first beam pair and the second beam pair, the parameter based on the first report and the third set of multiple reference signals.

A non-transitory computer-readable medium storing code for wireless communications is described. The code may include instructions executable by one or more processors to transmit first signaling indicating a set of multiple configurations including a first configuration and a second configuration, the first configuration indicating a first resource set that corresponds to a first set of multiple transmit beams associated with the network entity and a second resource set that corresponds to a second set of multiple transmit beams associated with the network entity and the second configuration indicating a third resource set, transmit, based on the first configuration, a first set of multiple reference signals using the first resource set and the first set of multiple transmit beams, transmit, based on the first configuration, a second set of multiple reference signals using the second resource set and the second set of multiple transmit beams, receive a first report indicating a first beam pair and a second beam pair, the first beam pair including a first transmit beam of the first set of multiple transmit beams and a first receive beam of a first set of multiple receive beams associated with a UE and the second beam pair including a second transmit beam of the second set of multiple transmit beams and a second receive beam of a second set of multiple receive beams associated with the UE, transmit, based on the first report, a third set of multiple reference signals using the first transmit beam, the second transmit beam, and the third resource set, and receive a second report including a parameter indicative of a correlation between the first beam pair and the second beam pair, the parameter based on the first report and the third set of multiple reference signals.

Some examples of the method, network entities, and non-transitory computer-readable medium described herein may further include operations, features, means, or instructions for transmitting, based on the first report, second signaling indicating one or more values associated with the third resource set, where transmitting the third set of multiple reference signals may be based on the one or more values.

In some examples of the method, network entities, and non-transitory computer-readable medium described herein, the one or more values include one or more TCI states, a SNR value that may be based on the first report, a number of data streams that may be based on the first report, or a combination thereof.

Some examples of the method, network entities, and non-transitory computer-readable medium described herein may further include operations, features, means, or instructions for transmitting, based on the second report, second signaling indicating for the UE to utilize the first beam pair and the second beam pair for MIMO communications between the UE and the network entity.

In some examples of the method, network entities, and non-transitory computer-readable medium described herein, the second signaling may be included in DCI. In some examples of the method, network entities, and non-transitory computer-readable medium described herein, the second configuration further includes a fourth resource set.

In some examples of the method, network entities, and non-transitory computer-readable medium described herein, the first report further indicates a third beam pair, the third beam pair comprising a third transmit beam of a third plurality of transmit beams and a third receive beam of a third plurality of receive beams, and the method, apparatuses, and non-transitory computer-readable medium may include further operations, features, means, or instructions for transmitting, based on the first report, a fourth set of multiple reference signals using the third transmit beam, the fourth resource set, and one of the first transmit beam or the second transmit beam.

In some examples of the method, network entities, and non-transitory computer-readable medium described herein, the first report further indicates a third beam pair and a fourth beam pair, the third beam pair comprising a third transmit beam of the first plurality of transmit beams and a third receive beam of the first plurality of receive beams and the fourth beam pair comprising a fourth transmit beam of the second plurality of transmit beams and a fourth receive beam of the second plurality of receive beams, and the method, apparatuses, and non-transitory computer-readable medium may include further operations, features, means, or instructions for transmitting, based on the first report, a fourth set of multiple reference signals using the third transmit beam, the fourth transmit beam, and the fourth resource set, where the second report further includes a second parameter indicative of a correlation between the third beam pair and the fourth beam pair, the second parameter based on the first report, and the fourth set of multiple reference signals.

In some examples of the method, network entities, and non-transitory computer-readable medium described herein, the second configuration includes a periodicity associated with the third resource set and the first report further indicates a third beam pair, the third beam pair including a third transmit beam of a third set of multiple transmit beams and a third receive beam of a third set of multiple receive beams.

In some examples of the method, network entities, and non-transitory computer-readable medium described herein, the network entity transmits the third set of multiple reference signals during a first periodic occasion of the third resource set according to the periodicity and the method, apparatuses, and non-transitory computer-readable medium may include further operations, features, means, or instructions for transmitting a fourth set of multiple reference signals using the third transmit beam and one of the first transmit beam or the second transmit beam during a second periodic occasion of the third resource set according to the periodicity.

In some examples of the method, network entities, and non-transitory computer-readable medium described herein, the network entity includes a first antenna panel configured to use the first set of multiple transmit beams and a second antenna panel configured to use the second set of multiple transmit beams and the user equipment includes a third antenna panel configured to use the first set of multiple receive beams and a fourth antenna panel configured to use the second set of multiple receive beams.

DETAILED DESCRIPTION

Figure 1:
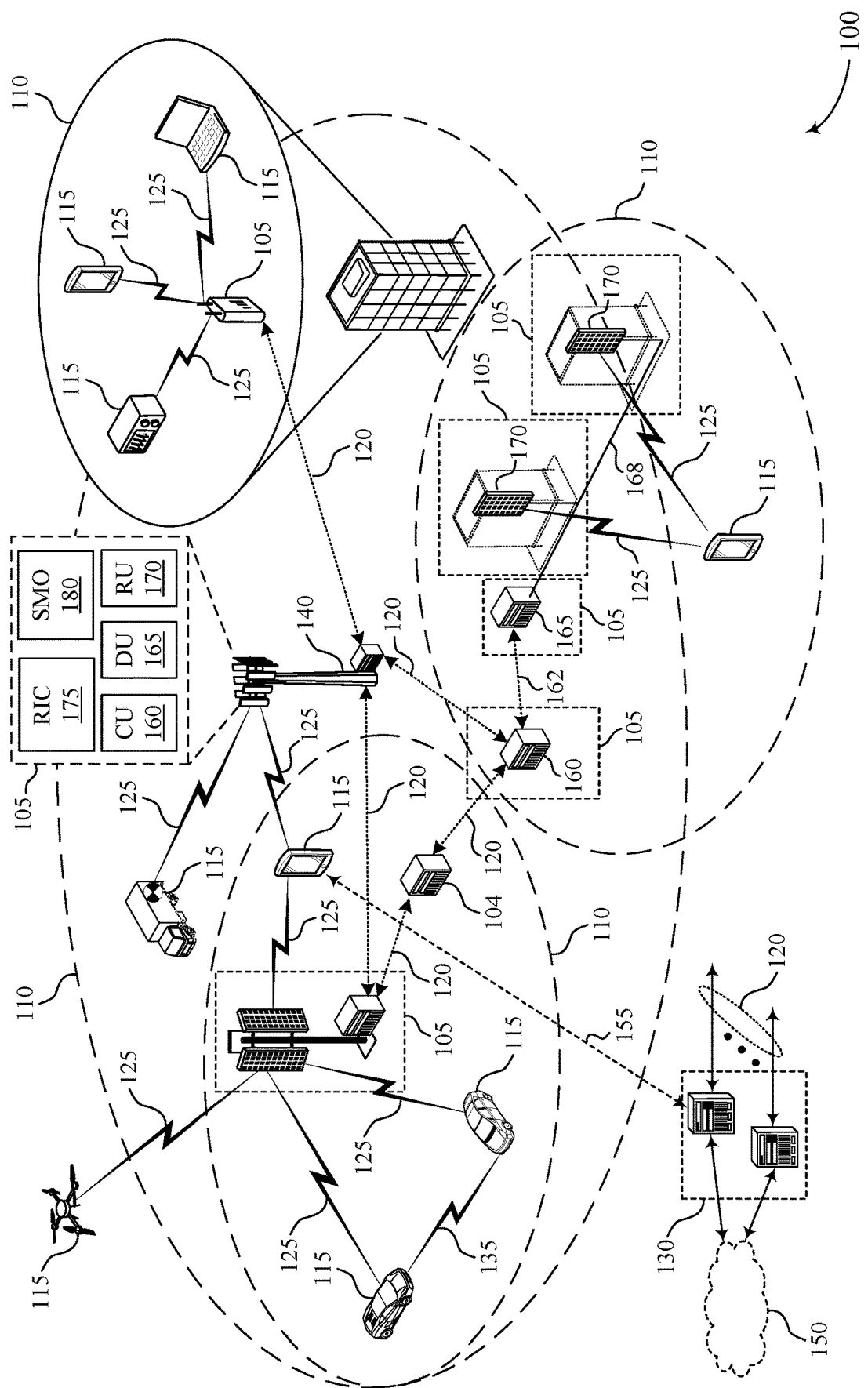
FIG. 1 shows an example of a wireless communications system that supports a beam management procedure that supports multiple input multiple output (MIMO) transmissions in accordance with one or more aspects of the present disclosure.

In some examples, a wireless communications system may support multiple input multiple output (MIMO) communication. To determine a beam pair (e.g., a transmit beam at a network entity and a receive beam at a user equipment (UE)) to use for MIMO communication, the UE and the network entity may undergo a beam management procedure. During the beam management procedure, the network entity may configure the UE with multiple resource sets that each correspond to a respective set of transmit beams of an antenna panel of the network entity and a respective set of receive beams of an antenna panel of the UE. For example, the network entity may configure the UE with a first resource set that corresponds to a first set of transmit beams of a first antenna panel of the network entity and a first set of receive beams of a first antenna panel of the UE and additionally configure the UE with a second resource set that corresponds to a second set of transmit beams of a second antenna panel of the network entity and a second set of receive beams of a second antenna panel of the UE.

The UE may receive, from the network entity, a first set of reference signals via the first set of receive beams and the first resource set and a second set of reference signals via the second set of receive beams and the second resource set. Upon receiving the first set of reference signals and the second set of reference signals, the UE may select a best beam pair for the first antenna panel (or a first beam pair) based on the first set of reference signals and a best beam pair for the second antenna panel (or a second beam pair) based on the second set of reference signals. The first beam pair may include a first transmit beam of the first set of transmit beams and a first receive beam of the first set of receive beams. The second beam pair may include a second transmit beam of the second set of transmit beams and a second receive beam of the second set of receive beams. Further, the UE may transmit a report to the network entity indicating the first beam pair and the second beam pair. However, the UE may not take into account correlations between beam pairs of different antenna panels when selecting the best beam pairs. Therefore, the best beam pairs selected and reported by the UE may not be the best beam pairs for MIMO communication.

As described herein, the network device may additionally configure the UE with a third resource set. After transmitting the report indicating the first beam pair and the second beam pair, the UE may receive an activation message from the network entity to activate the third resource set and additionally identify that the third resource set corresponds to the first beam pair and the second beam pair. In response to receiving the activation message, the UE may receive a third set of reference signals using the first receive beam, the second receive beam, and the third resource set. Further, the UE may measure the first transmit beam using the second receive beam and measure the second transmit beam using the first receive beam. The UE may determine a parameter that indicates a correlation between the first beam pair and the second beam pair and transmit a second report indicating the parameter to the network entity. Using the second report, the network entity may determine whether to utilize the first beam pair and the second beam pair for MIMO communication. Using such methods may allow the network entity and the UE to validate that the best reported beams are suited for MIMO communication.

Aspects of the disclosure are initially described in the context of wireless communications systems. Additional aspects of the disclosure are described in the context of a process flow. Aspects of the disclosure are further illustrated by and described with reference to apparatus diagrams, system diagrams, and flowcharts that relate to a beam management procedure that supports MIMO transmissions.

FIG. 1 shows an example of a wireless communications system 100 that supports a beam management procedure that supports MIMO transmissions in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

As described herein, the UE 115 and the network entity 105 may support a beam management procedure that supports MIMO. The method may include the UE 115 receiving signaling indicating a first configuration and a second configuration. The first configuration may indicate a first resource set that corresponds to a first set of transmit beams and a second resource set that corresponds to a second set of transmit beams, and the second configuration may indicate a third resource set. The UE 115 may receive a first set of reference signals using the first resource set and a first set of receive beams and a second set of reference signals using the second resource set and a second set of receive beams.

The UE 115 may transmit a first report indicating a first beam pair and a second beam pair. The first beam pair may include a first transmit beam of the first set of transmit beams and a first receive beam of the first set of receive beams and the second beam pair may include a second transmit beam of the second set of transmit beams and a second receive beam of the second set of receive beams. The UE 115 may receive a third set of reference signals using the first receive beam, the second receive beam, and the third resource set and transmit a second report that includes a parameter indicative of a correlation between the first beam pair and the second beam pair. Using the methods as described herein, the network entity 105 and the UE 115 may consider correlations between different beam pairs corresponding to different antenna panels during beam management which may improve communication reliability for MIMO transmissions.

Figure 2:
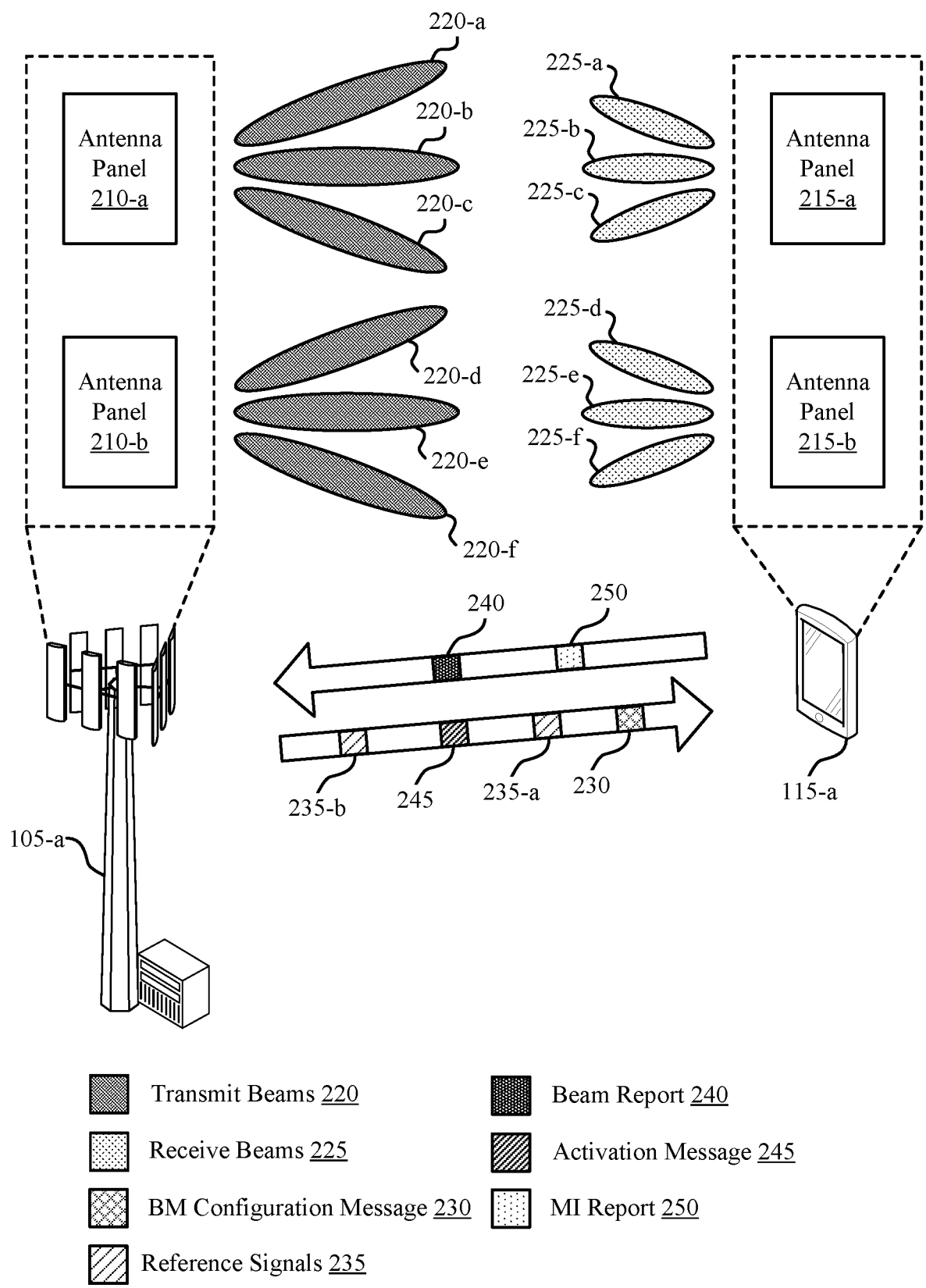
FIG. 2 shows an example of a wireless communications system that supports a beam management procedure that supports MIMO transmissions in accordance with one or more aspects of the present disclosure.

FIG. 2 shows an example of a wireless communications system 200 that supports a beam management procedure that supports MIMO transmissions in accordance with one or more aspects of the present disclosure. In some examples, the wireless communications system 200 may implement aspects of the wireless communications system 100. For example, the network entity 105-a and the UE 115-a may be examples of a network entity 105 and a UE 115, respectively, as described with reference to FIG. 1.

In some examples, devices of the wireless communications system 200 (e.g., the network entity 105-a and the UE 115-a) may support MIMO. MIMO may allow the devices to transmit two or more data stream simultaneously. Using a single cross-polarization antenna panel, the devices may support up to rank 2 MIMO or a 2×2 MIMO configuration. Thus, in order to support higher rank MIMO (e.g., 4 rank MIMO), the devices may include more than one cross-polarization antenna panel. For example, the network entity 105-a may include an antenna panel 210-a and an antenna panel 210-b and the UE 115-a may include an antenna panel 215-a and an antenna panel 215-b.

In some examples, the devices may perform a beam management procedure. During the beam management procedure, the UE 115-a may transmit a beam report to the network entity 105-a indicating one or more directional beam pairs (e.g., a transmit beam 220 and a receive beam 225) for communication between the network entity 105-a and the UE 115-a. Prior to the beam management procedure, the UE 115-a may receive a message from the network entity 105-a that includes one or more parameters associated with the beam report. The one or more parameters may include at least one of a reference signal configuration, a beam reporting setting, and a report quantity.

In some examples, the reference signal configuration may specify one or more sets of resources (e.g., sets of non-overlapping resources) over which the UE 115-a may receive reference signals (e.g., CSI-RSs) during the beam management procedure. For example, the reference signal configuration may specify a first resource set and a second resource set. The beam report setting may specify that group-based reporting is enabled or disabled for the UE 115-a. That is, the UE may include multiple directional beam pairs in the beam report, where each directional beam pair include a respective transmit beam 220 and a respective receive beam 225. Further, the report quantity may specify a type of signal strength measurement (e.g., RSRP or SINR) to include in the beam report. In some examples, the beam report may include a signal strength measurement for each directional beam pair.

To perform the beam management procedure, the network entity 105-a may transmit, to the UE 115-a, multiple reference signals via the antenna panel 210-a using the first resource set and a first set of transmit beams 220 (e.g., a transmit beam 220-a, a transmit beam 220-b, and a transmit beam 220-c). The UE 115-a may receive the multiple reference signals via the antenna panel 215-a using the first resource set and a first set of receive beams 225 (e.g., a receive beam 225-a, a receive beam 225-b, and a receive beam 225-c). Upon receiving multiple reference signals, the UE 115-a may measure a signal strength (e.g., SINR or RSRP) of each of the reference signals received using the first resource set. The UE 115-a may compare the measured signal strengths to one another and select a first beam pair corresponding to a reference signal whose measured signal strength is higher in comparison to the other reference signals. In some examples, the first beam pair may include the transmit beam 220-b and the receive beam 225-a.

Additionally, the network entity 105-a may transmit, to the UE 115-a, multiple reference signals via the antenna panel 210-b using the second resource set and a second set of transmit beams 220 (e.g., a transmit beam 220-d, a transmit beam 220-e, and a transmit beam 220-f). The UE 115-a may receive, from the network entity 105-a, the multiple reference signals via the antenna panel 215-b using the second resource set and a second set of receive beams 225 (e.g., a receive beam 225-d, a receive beam 225-e, and a receive beam 225-f). Upon receiving multiple reference signals, the UE 115-a may measure a signal strength (e.g., SINR or RSRP) of each of the reference signals received using the second resource set. The UE 115-a may compare the measured signal strengths to one another and select a second beam pair corresponding to a reference signal whose measured signal strength is higher in comparison to the other reference signals. In some examples, the second beam pair may include the transmit beam 220-e and the receive beam 225-e.

The UE 115-a may generate the beam report and transmit the beam report to the network entity 105-a. The beam report may include an indication of the first beam pair and an indication of the second beam pair. For subsequent communication, the network entity 105-a and the UE 115-a may utilize the first beam pair and the second beam pair. For example, the network entity may transmit a rank 4 MIMO transmission using the transmit beam 220-*b* and transmit beam 220-*e* and the UE 115-*a* may receive the rank 4 MIMO transmission using the receive beam 225-*a* and the receive beam 225-*e*.

However, the first beam pair and the second beam pair may not be the best beam pairs for MIMO communication. Using others methods, the UE 115-*a* may select two distinct beam pairs (e.g., the first beam pair and the second beam pair) that individually give the top two RSRP values or the top two SINR values. But the UE 115-*a* may not check to see if the beam pairs are correlated or not. That is, although the first beam pair and the second beam pair may individually give the highest signal strength values, the first beam pair and the second beam pair may interfere with one another during MIMO communication making the first beam pair and the second beam pair potentially less desirable for MIMO communication than other beam pair combinations.

As described herein, the UE 115-*a* may consider correlations between beam pairs during beam management procedures in order to select the best beam pairs for MIMO communication. In some examples, the UE 115-*a* may receive a beam management configuration message 230 from the network entity 105-*a*. The beam management configuration message 230 may include multiple configurations for beam management. For example, the beam management configuration message 230 may include, at least, a first configuration and a second configuration.

The first configuration may indicate a first resource set that corresponds to the first set of receive beams 225 (e.g., the receive beam 225-*a*, the receive beam 225-*b*, and the receive beam 225-*c*) and the first set of transmit beams 220 (e.g., the transmit beam 220-*a*, the transmit beam 220-*b*, and the transmit beam 220-*c*). Additionally, the first configuration may indicate a second resource set that corresponds to the second set of receive beams 225 (e.g., the receive beam 225-*d*, the receive beam 225-*e*, and the receive beam 225-*f*) and the second set of transmit beams 220 (e.g., the transmit beam 220-*d*, the transmit beam 220-*e*, and the transmit beam 220-*f*). In some examples, the first configuration may include TCI states corresponding to the resource sets. The TCI states may indicate the corresponding receive beams 225, the corresponding transmit beams 220, or both for the resource sets. The second configuration may include a third resource set. In some examples, the second configuration may not indicate a set of transmit beams 220 and a set of receive beams 225 corresponding to the third resource set. That is, the second configuration may not include TCI states for the third resource set.

The network entity 105-*a* may transmit, to the UE 115-*a*, multiple reference signals 235-*a* via the antenna panel 210-*a* using the first resource set and the first set of transmit beams 220. The UE 115-*a* may receive the multiple reference signals 235-*a* via the antenna panel 215-*a* using the first resource set and the first set of receive beams 225. Upon receiving the multiple reference signals 235-*a*, the UE 115-*a* may measure a signal strength (e.g., SINR or RSRP) of each of the reference signals 235-*a* received using the first resource set. The UE 115-*a* may compare the measured signal strengths to one another and select a first beam pair corresponding to a reference signal 235-*a* whose measured signal strength is higher in comparison to the other reference signals 235-*a*. In some examples, the first beam pair may include the transmit beam 220-*b* and the receive beam 225-*a*.

Additionally, the network entity 105-*a* may transmit, to the UE 115-*a*, multiple reference signals 235-*a* via the antenna panel 210-*b* using the second resource set and the second set of transmit beams 220. The UE 115-*a* may receive, from the network entity 105-*a*, the multiple reference signals 235-*a* via the antenna panel 215-*b* using the second resource set and the second set of receive beams 225. Upon receiving multiple reference signals 235-*a*, the UE 115-*a* may measure a signal strength (e.g., SINR or RSRP) of each of the reference signals 235-*a* received using the second resource set. The UE 115-*a* may compare the measured signal strengths to one another and select a second beam pair corresponding to a reference signal 235-*b* whose measured signal strength is higher in comparison to the other reference signals 235-*a*. In some examples, the second beam pair may include the transmit beam 220-*e* and the receive beam 225-*e*.

Upon selecting the first beam pair and the second beam pair, the UE 115-*a* may perform channel measurement. Channel measurement may include the UE 115-*a* calculating properties of a communication link between the UE 115-*a* and the network entity 105-*a*. The communication link for a signal may be characterized by the transmit beam 220 used by the network entity 105-*a* to transmit the signal, the receive beam 225 used by the UE 115-*a* to receive the signal, and the resources over which the signal is communicated. In this case, the UE 115-*a* may measure a first channel associated with the first beam pair and the first resource set and a second channel associated with the second beam pair and the second resource set. The first channel measurement may be represented by Equation 1 and the second channel measurement may be represented by Equation 2.

In Equation 1, $w_a^* H_{1,1} f_3$ may be a channel between antenna panel 210-*a* and antenna panel 215-*a* using the selected transmit beam 220 associated with the antenna panel 210-*a* and the selected receive beam 225 associated with the antenna panel 215-*a* (e.g., the first beam pair). In Equation 2, $w_e^* H_{2,2} f_8$ may be a channel between the antenna panel 210-*b* and antenna panel 215-*b* using the selected transmit beam 220 associated with the antenna panel 210-*b* and the selected receive beam 225 associated with the antenna panel 215-*b* (e.g., the second beam pair). The subscript for w (e.g., a or e) may refer to some receive beam 225 and the subscript for f (3 or 8) may refer to some transmit beam 220. The first subscript and the second subscript for H (e.g., 1,1 or 1,2) may refer to some transmit antenna panel 210 and some receive antenna panel 215, respectively. In some examples, the UE 115-*a* may store the first channel measurement and the second channel measurement in its memory for future reference.

$$w_a^* H_{1,1} f_3 \tag{1}$$

$$w_e^* H_{2,2} f_8 \tag{2}$$

The UE 115-*a* may generate a beam report 240 that includes an indication of the beam pairs selected by the UE 115-*a* (e.g., the first beam pair and the second beam pair), as well as signal strength values (e.g., RSRP or SINR) corresponding to each of the selected beams pairs, and transmit the beam report 240 to the network entity 105-*a*. In some examples, upon selecting the first beam pair and the second beam pair, the UE 115-*a* may identify that the third resource set corresponds to the selected beam pairs and activate the third resource set. In some examples, the UE 115-*a* may activate the third resource set in response to an activation message 245 received from the network entity 105-*a* which may include an indication of a beam pair combination associated with the third resource set (e.g., the first beam pair and the second beam pair).

In one example, the activation message 245 may include a codepoint mapped to the beam pair combination. The UE 115-*a* may identify the mapping between the codepoint and the beam pair combination based on a mapping rule that is either preconfigured at the UE 115-*a* or indicated to the UE 115-*a* via the second configuration. For example, based on the rule, the UE 115-*a* may determine that a codepoint 0 maps to transmit beams 220-*a* and 220-*d*, a codepoint 1 maps to transmit beams 220-*b* and 220-*e*, and a codepoint 2 maps to transmit beams 220-*c* and 220-*f*.

In another example, the mapping rule may be based on the beam report 240. For example, the UE 115-*a* may identify that the codepoint 0 (or a first codepoint of a sequence of codepoints) maps to transmit beam 220-*b* and transmit beam 220-*e* because the first beam pair and the second beam pair were included in the beam report 240. Alternatively, the mapping between the codepoint and the beam pair combination may be explicitly indicated to the UE 115-*a* via the second configuration. That is, the network entity 105-*a* may have a codepoint definition for each of the combinations of beam pairs. In some examples, the activation message 245 may be included in downlink control information (DCI). In such example, the DCI may carry an additional field that includes the codepoint or existing bits of the DCI can be repurposed for indicating the codepoint.

Alternatively, the UE 115-*a* may identify a default beam pair combination for the third set resource set. In some examples, the default beam pair combination may be preconfigured at the UE 115-*a* via the second configuration. Alternatively, the UE 115-*a* may identity (or assume) that the beam pair combination included in the beam report 240 corresponds to the third resource set. In such examples, the UE 115-*a* may not receive the activation message 245.

Upon activating the third resource set, the UE 115-*a* may monitor the third resource set for multiple reference signals 235-*b*. In some examples, the network entity 105-*a* may transmit, to the UE 115-*a*, at least, a first reference signal 235-*b* via the antenna panel 210-*a* using the third resource set and the transmit beam 220-*b*. Additionally, the network entity 105-*a* may transmit, to the UE 115-*a*, at least, a second reference signal 235-*b* via the antenna panel 210-*b* using the third resource set and the transmit beam 220-*e*. The UE 115-*a* may receive, from the network entity 105-*a*, at least, the first reference signal 235-*b* and the second reference signal 235-*b* using the third resource set via the antenna panel 215-*a* and the antenna panel 215-*b* using the receive beam 225-*e* and the receive beam 225-*a*, respectively.

Upon receiving the multiple reference signals 235-*b*, the UE 115-*a* may measure a third channel associated with the transmit beam 220-*b*, the receive beam 225-*e*, and the third resource set and a fourth channel associated with the transmit beam 220-*e*, the receive beam 225-*a*, and the third resource set. That is, the UE 115-*a* may measure the transmit beam 220 of the first beam pair using the receive beam 225 of the second beam pair to determine the third channel and additionally, measure the transmit beam 220 of the second beam pair using the receive beam 225 of the first beam pair to determine the fourth channel. The third channel measurement may be represented by Equation 3 and the fourth channel measurement may be represented by Equation 4.

In Equation 3, $w_e^* H_{2,1} f_3$ may be a channel between the antenna panel 210-*a* and the antenna panel 215-*b* using the selected transmit beam 220 associated with the antenna panel 210-*a* and the selected receive beam 225 associated with the antenna panel 215-*b*. In Equation 4, $w_a^* H_{1,2} f_8$ may be a channel between the antenna panel 210-*b* and the antenna panel 215-*a* using the selected transmit beam 220 associated with the antenna panel 210-*b* and the selected receive beam 225 associated with the antenna panel 215-*a*.

$$w_e^* H_{2,1} f_3 \tag{3}$$

$$w_a^* H_{1,2} f_8 \tag{4}$$

The UE 115-*a* may then determine a parameter that defines a correlation between the selected beam pairs. For example, the UE 115-*a* may determine an amount of interference between the first beam pair and the second beam pair. To determine the parameter, the UE 115-*a* may determine an effective MIMO channel associated with the selected beam pairs. The effective channel may include a channel matrix that includes the first channel, the second channel, the third channel, and the fourth channel. For example, the effective channel (or $H_{eff}$) may be represented by Equation 5. The UE 115-*a* may then determine the mutual information (or MI) between the selected beam pairs using Equation 6. The mutual information may represent an achievable spectral efficiency or supportable throughput for MIMO communication (e.g., channel quality index (CQI)).

$$H_{eff} = \begin{bmatrix} w_e^* H_{2,1} f_3 & w_e^* H_{2,1} f_3 \\ w_e^* H_{2,1} f_3 & w_e^* H_{2,1} f_3 \end{bmatrix} \tag{5}$$

$$MI = \log_2 \det\left(I + \frac{SNR}{N_s} H_{eff} H_{eff}^*\right) \tag{6}$$

In some examples, the SNR in Equation 6 may be based on the beam report 240. For example, the SNR may be equal to a minimum, a maximum, or an average of the RSRPs included in the beam report 240. Similarly, $N_s$ (or rank assumption) in Equation 6 may be based on the beam report 240. For example, $N_s$ may be based on whether or not a difference between the RSRPs included in the beam report 240 are above or below a first threshold or whether a minimum RSRP of the beam report 240 is below a second threshold. In some examples, the UE 115-*a* may independently calculate the SNR and the $N_s$. Alternatively, the network entity 105-*a* may include the SNR and the $N_s$ in the activation message 245.

Upon determining the mutual information, the UE 115-*a* may transmit a mutual information report 250 (via L1 signaling) to the network entity 105-*a*. In some examples, the mutual information report 250 may include the mutual information (e.g., spectral efficiency or CQI) for the effective channel associated with the selected beam pairs. In some examples, based on this mutual information report 250, the network entity 105-*a* may determine whether to utilize the selected beam pair for future communications (e.g., MIMO communication). In some examples, if a value of the mutual information is low (e.g., below a threshold), the network entity 105-*a* may instruct the UE 115-*a* to utilize a beam pair different from the selected beam pair for MIMO communications or refrain from operating in accordance to MIMO. Alternatively, if the value of the mutual information is high (e.g., above a threshold), the network entity 105-*a* may instruct the UE 115-*a* to utilize the selected beam pair for MIMO communications.

In some examples, the UE 115-*a* may report multiple beam groups to the network entity 105-*a*. A beam group may include multiple beam pairs, each beam pair corresponding to a transmit beam 220 and a receive beam 225 of a respective Tx/Rx antenna. For example, a first beam group may include the first beam pair and the second beam pair. Thus, if the UE 115-*a* supports the reporting of multiple beam groups, the beam report 240 may include the first beam group and a second beam group different from the first beam group (e.g., a third beam pair and a fourth beam pair). In such example, for each beam group, the network entity 105-*a* may send the activation message 245 to activate the third resource set and indicate a respective transmit beam 220 and a respective receive beam 225 (e.g., TCI state) for the respective third resource set. That is, the network entity 105-*a* may activate or reactivate the third resource set multiple times for each beam group such that the UE 115-*a* may determine a correlation parameter for each of the different beam groups.

In some examples, the UE 115-*a* and the network entity 105-*a* may support more than two antenna panels (e.g., 3 antenna panels). In such example, the second configuration may include multiple resource sets. For example, the beam management configuration message 230 may include, at least, the third resource set and an additional fourth resource set. Further, the beam report 240 may include one beam pair for each antenna panel present at the UE 115-*a* and the network entity 105-*a*. For each resource set of the second configuration, the network entity 105-*a* may send a corresponding activation message 245 that activates the respective resource set and indicates a respective transmit beam 220 and a respective receive beam 225 for the respective resource set. The UE 115-*a* may utilize each resource set of the multiple resource sets indicated in the second configuration to measure correlations between different combinations of beam pairs of the multiple beam pairs.

Alternatively, the second configuration may include the third resource set as well as a periodicity associated with the third resource set. In such example, the network entity 105-*a* may transmit a single activation message 245 that activates the third resource set and indicates a respective transmit beam 220 and a respective receive beam 225 (e.g., a TCI state) for each periodic occasion of the third resource set. The UE 115-*a* may utilize each periodic occasions of the third resource set to measure correlations between different combinations of beam pairs of the multiple beam pairs.

In some examples, the mutual information report 250 may include a parameter for each measured beam pair combination. Alternatively, the UE 115-*a* may transmit a separate mutual information report 250 for each measured beam pair combination that includes a parameter for the respective beam pair combination. For example, if the UE 115-*a* measures two beam pair combinations, the UE 115-*a* may transmit a first mutual information report 250 that includes a parameter for one of the beam pair combinations and transmit a second mutual information interference report 250 that includes a parameter for the other beam pair combination. Using the methods as described herein may allow the network entity 105-*a* and the UE 115-*a* to account for correlation between beam pairs during beam management such that a best beam for MIMO transmissions is selected.

Figure 3:
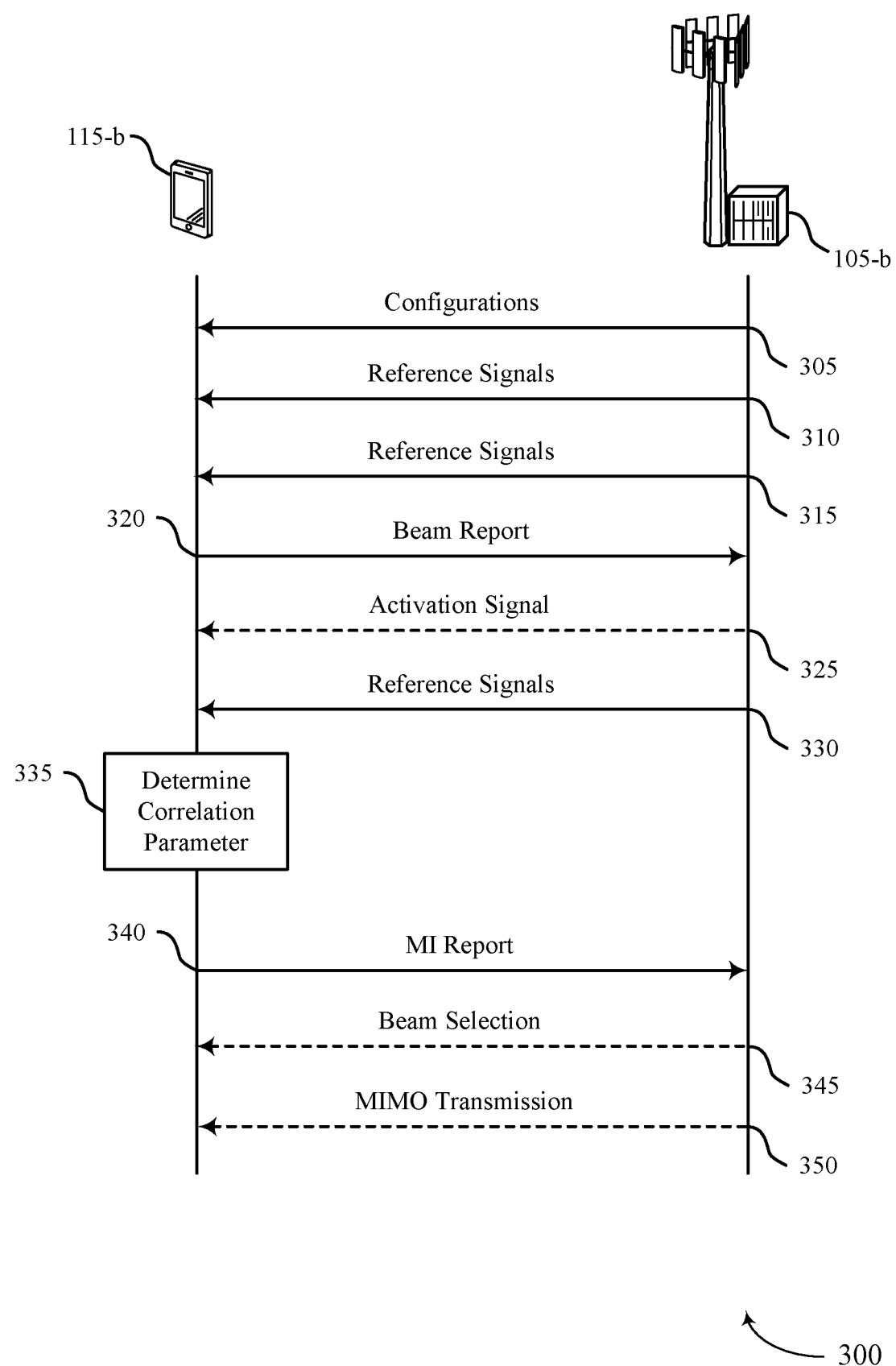
FIG. 3 shows an example of a process flow that supports a beam management procedure that supports MIMO transmissions in accordance with one or more aspects of the present disclosure.

FIG. 3 shows an example of a process flow 300 that supports a beam management procedure that supports MIMO transmissions in accordance with one or more aspects of the present disclosure. In some examples, the process flow 300 may implement, or be implemented by, aspects of the wireless communications system 100 and the wireless communications system 200. For example, the process flow 300 may be implemented by a network entity 105-*b* and a UE 115-*b* which may be examples of a UE 115 and a network entity 105, respectively, as described with reference to FIGS. 1 and 2. Alternative examples of the following may be implemented, where some steps are performed in a different order then described or are not performed at all. In some cases, steps may include additional features not mentioned below, or further steps may be added At 305, the UE 115-*b* may receive, from the network entity 105-*b*, first signaling indicating multiple configurations. The multiple configurations may include a first configuration and a second configuration. The first configuration may indicate a first resource set corresponding to a first set of transmit beams associated with the network entity 105-*b* and a second resource set corresponding to a second set of transmit beams associated with the network entity 105-*b*. The second configuration may indicate a third resource set.

At 310, the UE 115-*b* may receive, from the network entity 105-*b* and based on the first configuration, a first set of reference signals using the first resource set and a first set of receive beams associated with the UE 115-*b*.

At 315, the UE 115-*b* may receive, from the network entity 105-*b* and based on the first configuration, a second set of reference signals using the second resource set and a second set of receive beams.

In some examples, the network entity 105-*b* may include two antenna panels. A first antenna panel of the network entity 105-*b* may be configured to use the first set of transmit beams and a second antenna panel of the network entity 105-*b* may be configured to use the second set of transmit beams. Further, the UE 115-*b* may include two antenna panels. A first antenna panel of the UE 115-*b* may be configured to use the first set of receive beams and a second antenna panel of the UE 115-*b* may be configured to use the second set of receive beams.

At 320, the UE 115-*b* may transmit, to the network entity 105-*b*, a first report indicating a first beam pair and a second beam pair. In some examples, the first beam pair may include a first transmit beam of the first set of transmit beams and a first receive beam of the first set of receive beams. The second beam pair may include a second transmit beam of the second set of transmit beams and a second receive beam of the second set of receive beams.

At 325, the UE 115-*b* may receive, from the network entity 105-*b*, second signaling indicating to activate the third set of resources. In some examples, the second signaling may include one or more values associated with the third resource set such as one or more TCI states, an SNR value, or a number of data streams. In some examples, the SNR value may be based on the first report.

At 330, the UE 115-*b* may receive, from the network entity 105-*b* and based on the first report, a third set of reference signals using the first receive beam, the second receive beam, and the third resource set.

At 335, the UE 115-*b* may determine a parameter that indicates a correlation between the first beam pair and the second beam pair. In some examples, the UE 115-*b* may measure the effective channel based on the first report and the third set of reference signals and determine the parameter based on the effective channel measurements, the SNR, and the number of data streams.

At 340, the UE 115-*b* may transmit, to the network entity 105-*b*, a second report that includes the parameters that indicates a correlation between the first beam pair and the second beam pair.

At 345, the UE 115-*b* may receive, from the network entity 105-*b* and based on the second report, third signaling indicating for the UE 115-*b* to utilize the first beam pair and the second beam pair for MIMO communications between the UE 115-*b* and the network entity 105-*b*. In some examples, the second signaling may be included in DCI.

At 350, the UE 115-b may receive a MIMO transmission from the network entity 105-b using the first receive beam of the first beam pair and the second receive beam of the second beam pair based on the third signaling.

In some examples, the UE 115-b may support multi-group reporting. In such case, the second configuration may further include a fourth resource set and the first report may further include a third beam pair and a fourth beam pair. The third beam pair may include a third transmit beam of the first set of transmit beams and a third receive beam of the first set of transmits and the fourth beam pair may include a fourth transmit beam of the second set of transmit beams and a fourth receive beam of the second set of receive beams. The UE 115-b may receive a fourth set of reference signals using the third receive beam, the fourth receive beam, and the fourth resource set and the second report may further include a parameters that indicates a correlation between the third beam pair and the fourth beam pair.

Additionally or alternatively, the UE 115-b and the network entity 105-b may support more than two antenna panels. For example, the UE 115-b and the network entity 105-b may support the first antenna panel, the second antenna panel, and a third antenna panel. The third antenna panel of the network entity 105-b may be configured to use the third set of transmit beams and the third antenna panel of the UE 115-b may be configured to use the third set of receive beams. In such case, the second configuration may further include a fourth resource set and the first report may further include a third beam pair. In some examples, the third beam pair may include a third transmit beam of the third set of transmit beams and a third receive beam of the third set of receive beams. The UE 115-b may receive a fourth set of reference signals using the third receive beam, the fourth resource set, and one of the first receive beam or the second receive beam.

Additionally or alternatively, the second configuration may include a periodicity associated with the third resource set. In such case, the UE 115-b may receive the third set of reference signals during a first periodic occasion of the third set of resources and a fourth set of reference signals using the third receive beam and one of the first receive beam or the second receive beam during a second periodic occasion of the third set of resources.

Figure 4:
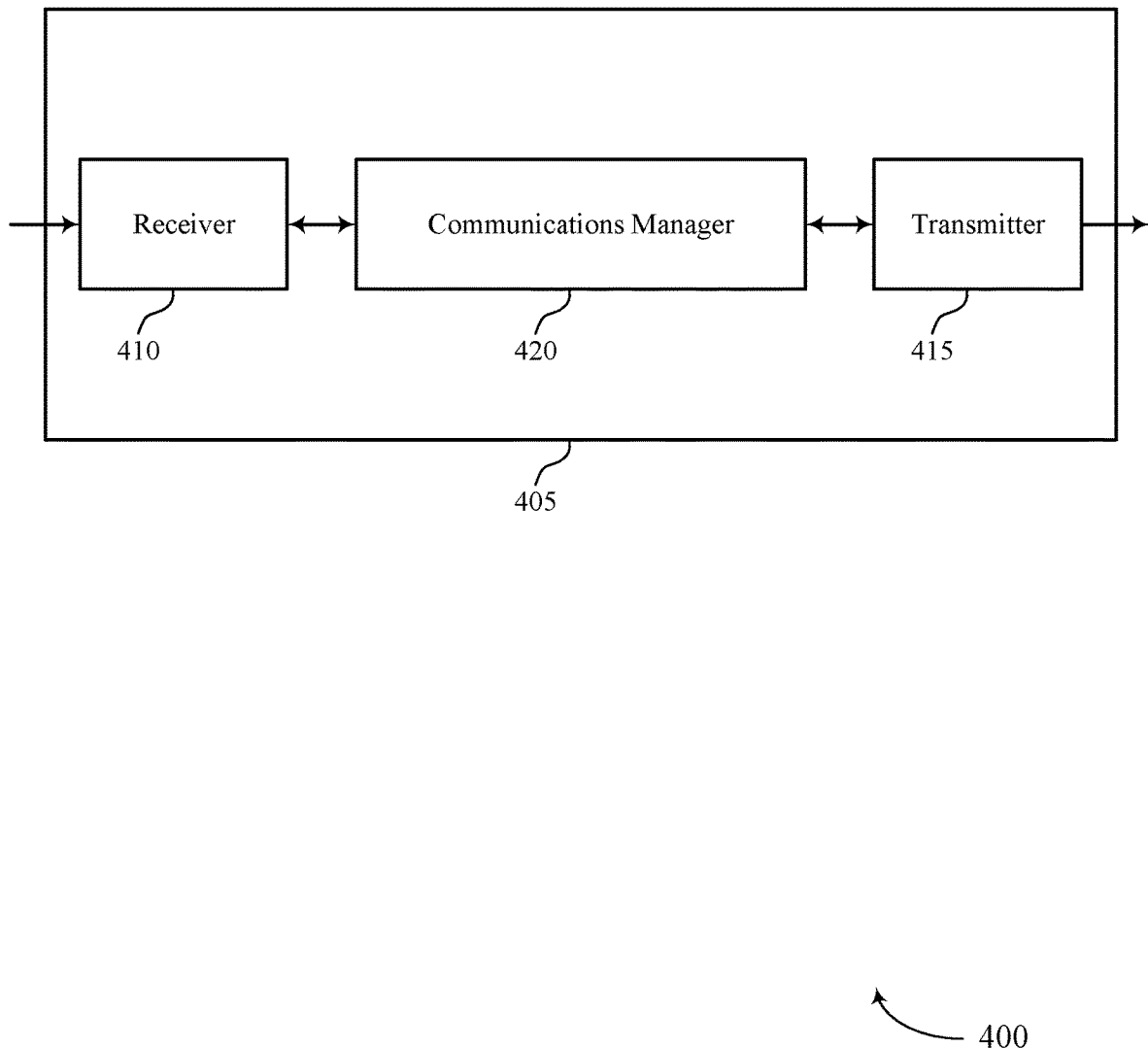
FIGS. 4 and 5 show block diagrams of devices that support a beam management procedure that supports MIMO transmissions in accordance with one or more aspects of the present disclosure.

FIG. 4 shows a block diagram 400 of a device 405 that supports a beam management procedure that supports MIMO transmissions in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to a beam management procedure that supports MIMO transmissions). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to a beam management procedure that supports MIMO transmissions). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations or components thereof may be examples of means for performing various aspects of a beam management procedure that supports MIMO transmissions as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor (e.g., referred to as a processor-executable code). If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for receiving first signaling indicating a set of multiple configurations including a first configuration and a second configuration, the first configuration indicating a first resource set that corresponds to a first set of multiple transmit beams associated with a network entity and a second resource set that corresponds to a second set of multiple transmit beams associated with the network entity, and the second configuration indicating a third resource set. The communications manager 420 is capable of, configured to, or operable to support a means for receiving, based on the first configuration, a first set of multiple reference signals using the first resource set and a first set of multiple receive beams associated with the UE. The communications manager 420 is capable of, configured to, or operable to support a means for receiving, based on the first configuration, a second set of multiple reference signals using the second resource set and a second set of multiple receive beams. The communications manager 420 is capable of, configured to, or operable to support a means for transmitting a first report indicating a first beam pair and a second beam pair, the first beam pair including a first transmit beam of the first set of multiple transmit beams and a first receive beam of the first set of multiple receive beams and the second beam pair including a second transmit beam of the second set of multiple transmit beams and a second receive beam of the second set of multiple receive beams. The communications manager 420 is capable of, configured to, or operable to support a means for receiving, based on the first report, a third set of multiple reference signals using the first receive beam, the second receive beam, and the third resource set. The communications manager 420 is capable of, configured to, or operable to support a means for transmitting a second report including a parameter indicative of a correlation between the first beam pair and the second beam pair, the parameter based on the first report and the third set of multiple reference signals.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for reduced processing.

Figure 5:
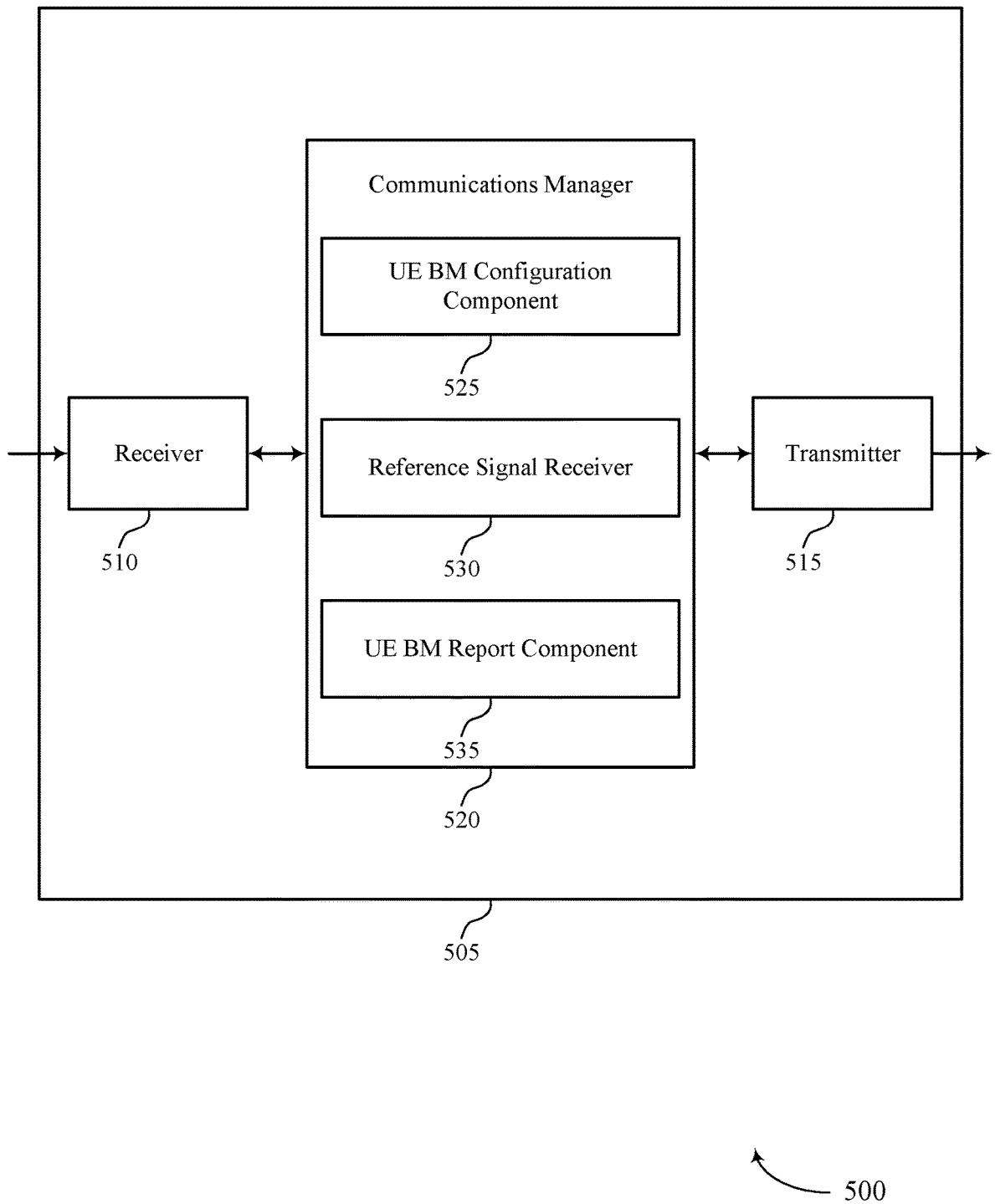

FIG. 5 shows a block diagram 500 of a device 505 that supports a beam management procedure that supports MIMO transmissions in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to a beam management procedure that supports MIMO transmissions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to a beam management procedure that supports MIMO transmissions). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of a beam management procedure that supports MIMO transmissions as described herein. For example, the communications manager 520 may include a UE BM configuration component 525, a reference signal receiver 530, a UE BM report component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The UE BM configuration component 525 is capable of, configured to, or operable to support a means for receiving first signaling indicating a set of multiple configurations including a first configuration and a second configuration, the first configuration indicating a first resource set that corresponds to a first set of multiple transmit beams associated with a network entity and a second resource set that corresponds to a second set of multiple transmit beams associated with the network entity, and the second configuration indicating a third resource set. The reference signal receiver 530 is capable of, configured to, or operable to support a means for receiving, based on the first configuration, a first set of multiple reference signals using the first resource set and a first set of multiple receive beams associated with the UE. The reference signal receiver 530 is capable of, configured to, or operable to support a means for receiving, based on the first configuration, a second set of multiple reference signals using the second resource set and a second set of multiple receive beams. The UE BM report component 535 is capable of, configured to, or operable to support a means for transmitting a first report indicating a first beam pair and a second beam pair, the first beam pair including a first transmit beam of the first set of multiple transmit beams and a first receive beam of the first set of multiple receive beams and the second beam pair including a second transmit beam of the second set of multiple transmit beams and a second receive beam of the second set of multiple receive beams. The reference signal receiver 530 is capable of, configured to, or operable to support a means for receiving, based on the first report, a third set of multiple reference signals using the first receive beam, the second receive beam, and the third resource set. The UE BM report component 535 is capable of, configured to, or operable to support a means for transmitting a second report including a parameter indicative of a correlation between the first beam pair and the second beam pair, the parameter based on the first report and the third set of multiple reference signals.

Figure 6:
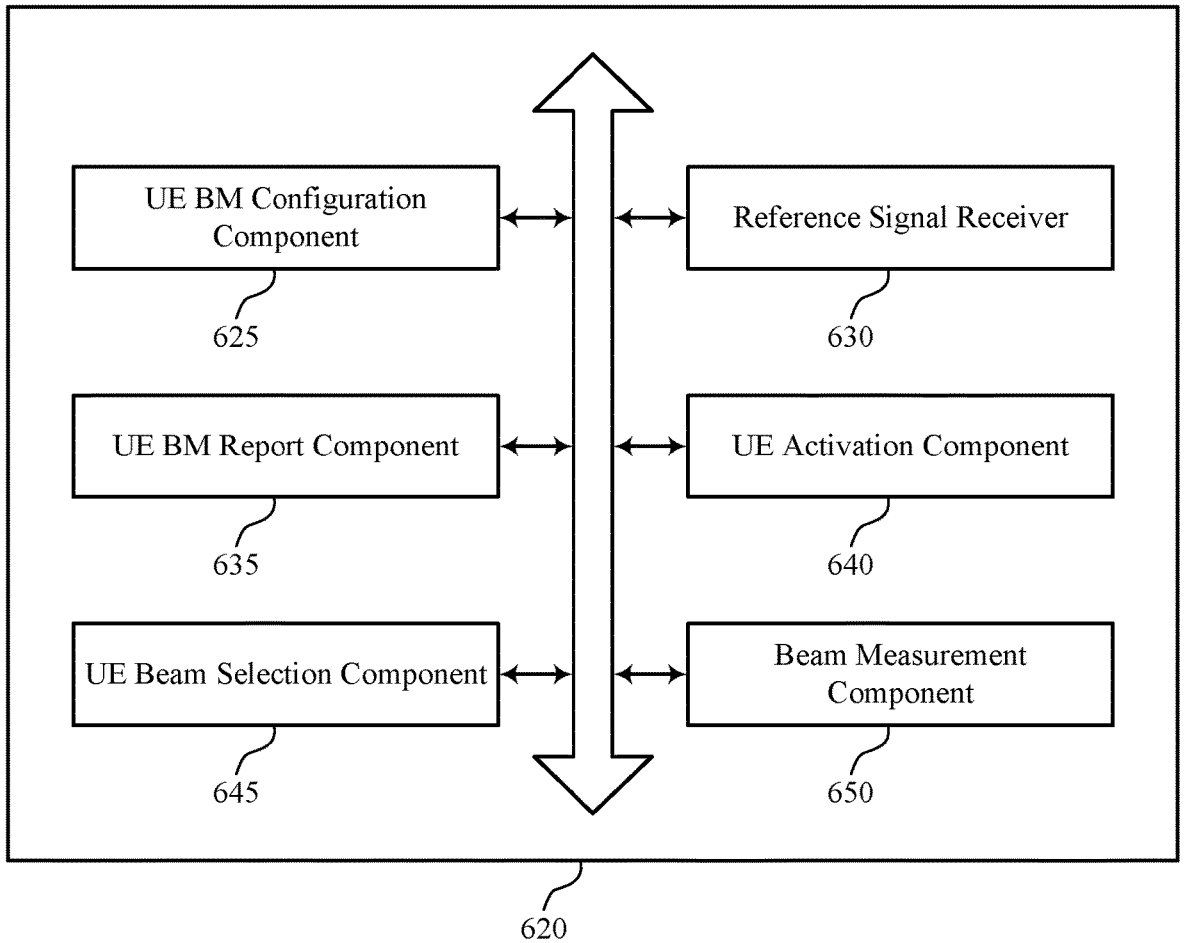
FIG. 6 shows a block diagram of a communications manager that supports a beam management procedure that supports MIMO transmissions in accordance with one or more aspects of the present disclosure.

FIG. 6 shows a block diagram 600 of a communications manager 620 that supports a beam management procedure that supports MIMO transmissions in accordance with one or more aspects of the present disclosure. The communications manager 620 may be an example of aspects of a communications manager 420, a communications manager 520, or both, as described herein. The communications manager 620, or various components thereof, may be an example of means for performing various aspects of a beam management procedure that supports MIMO transmissions as described herein. For example, the communications manager 620 may include a UE BM configuration component 625, a reference signal receiver 630, a UE BM report component 635, a UE activation component 640, a UE beam selection component 645, a beam measurement component 650, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. The UE BM configuration component 625 is capable of, configured to, or operable to support a means for receiving first signaling indicating a set of multiple configurations including a first configuration and a second configuration, the first configuration indicating a first resource set that corresponds to a first set of multiple transmit beams associated with a network entity and a second resource set that corresponds to a second set of multiple transmit beams associated with the network entity, and the second configuration indicating a third resource set. The reference signal receiver 630 is capable of, configured to, or operable to support a means for receiving, based on the first configuration, a first set of multiple reference signals using the first resource set and a first set of multiple receive beams associated with the UE. In some examples, the reference signal receiver 630 is capable of, configured to, or operable to support a means for receiving, based on the first configuration, a second set of multiple reference signals using the second resource set and a second set of multiple receive beams. The UE BM report component 635 is capable of, configured to, or operable to support a means for transmitting a first report indicating a first beam pair and a second beam pair, the first beam pair including a first transmit beam of the first set of multiple transmit beams and a first receive beam of the first set of multiple receive beams and the second beam pair including a second transmit beam of the second set of multiple transmit beams and a second receive beam of the second set of multiple receive beams. In some examples, the reference signal receiver 630 is capable of, configured to, or operable to support a means for receiving, based on the first report, a third set of multiple reference signals using the first receive beam, the second receive beam, and the third resource set. In some examples, the UE BM report component 635 is capable of, configured to, or operable to support a means for transmitting a second report including a parameter indicative of a correlation between the first beam pair and the second beam pair, the parameter based on the first report and the third set of multiple reference signals.

In some examples, the UE activation component 640 is capable of, configured to, or operable to support a means for receiving, based on the first report, second signaling indicating one or more values associated with the third resource set, where receiving the third set of multiple reference signals is based on the one or more values.

In some examples, the one or more values include one or more transmission configuration indication states, a signal to noise ratio value that is based on the first report, a number of data streams that is based on the first report, or a combination thereof.

In some examples, the beam measurement component 650 is capable of, configured to, or operable to support a means for measuring an effective channel between the UE and the network entity based on the first report and the third set of multiple reference signals. In some examples, the beam measurement component 650 is capable of, configured to, or operable to support a means for determining the parameter based on the effective channel measurement, the signal to noise ratio value, and the number of data streams.

In some examples, the UE beam selection component 645 is capable of, configured to, or operable to support a means for receiving, based on the second report, second signaling indicating for the UE to utilize the first beam pair and the second beam pair for multiple-input multiple-output communications between the UE and the network entity. In some examples, the second signaling is included in downlink control information. In some examples, the second configuration further includes a fourth resource set.

In some examples, the first report further indicates a third beam pair, and the reference signal receiver 630 is capable of, configured to, or operable to support a means for receiving, based on the first report, a fourth set of multiple reference signals using the third receive beam, the fourth resource set, and one of the first receive beam or the second receive beam.

In some examples, the first report further indicates a third beam pair and a fourth beam pair, and the reference signal receiver 630 is capable of, configured to, or operable to support a means for receiving, based on the first report, a fourth set of multiple reference signals using the third receive beam, the fourth receive beam, and the fourth resource set, where the second report further includes a second parameter indicative of a correlation between the third beam pair and the fourth beam pair, the second parameter based on the first report and the fourth set of multiple reference signals.

In some examples, the second configuration includes a periodicity associated with the third resource set. In some examples, the first report further indicates a third beam pair, the third beam pair including a third transmit beam of a third set of multiple transmit beams and a third receive beam of a third set of multiple receive beams.

In some examples, the UE receives the third set of multiple reference signals during a first periodic occasion of the third resource set according to the periodicity, and the reference signal receiver 630 is capable of, configured to, or operable to support a means for receiving a fourth set of multiple reference signals using the third receive beam and one of the first receive beam or the second receive beam during a second periodic occasion of the third resource set according to the periodicity.

In some examples, the network entity includes a first antenna panel configured to use the first set of multiple transmit beams and a second antenna panel configured to use the second set of multiple transmit beams. In some examples, the user equipment includes a third antenna panel configured to use the first set of multiple receive beams and a fourth antenna panel configured to use the second set of multiple receive beams.

Figure 7:
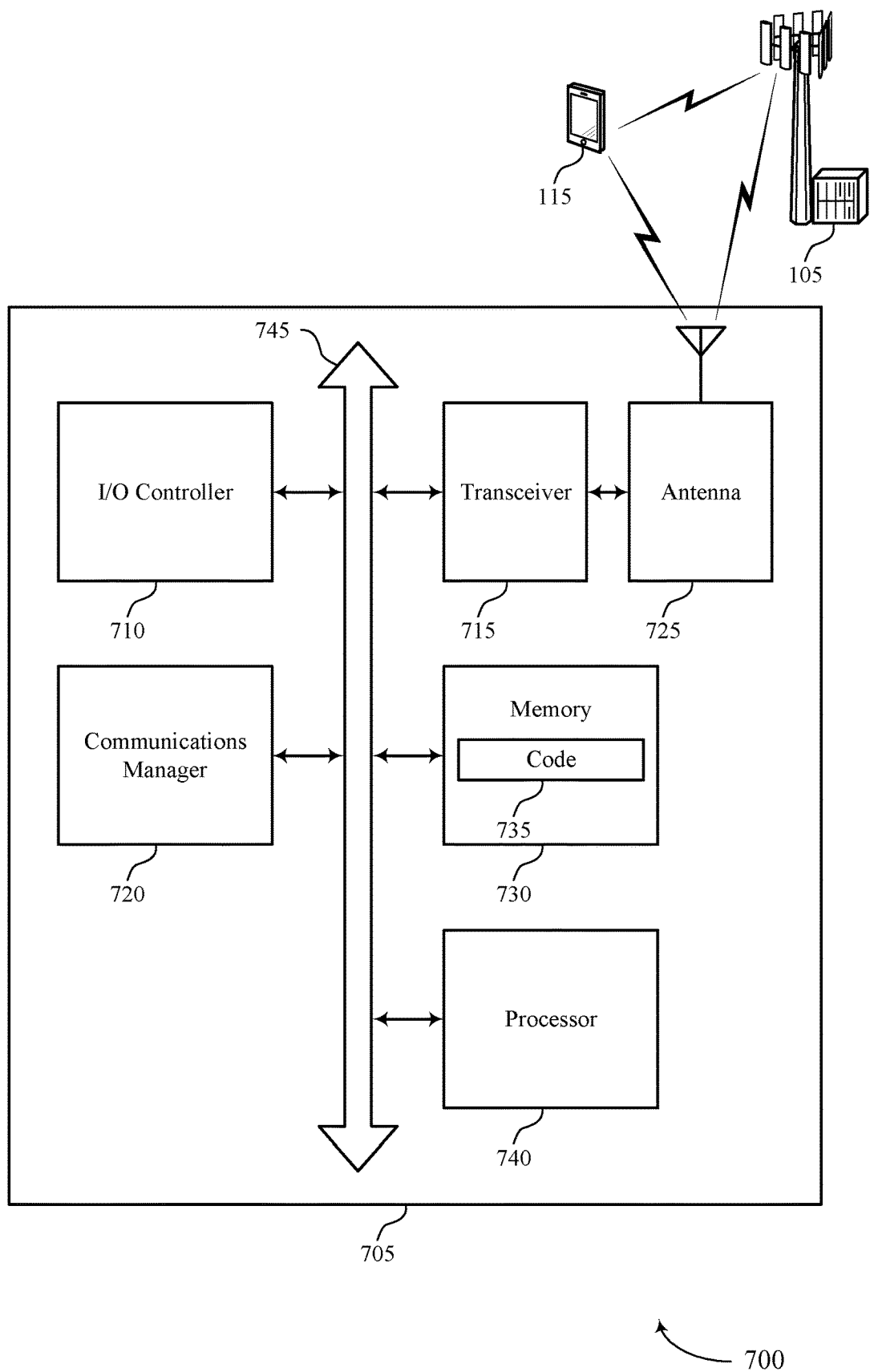
FIG. 7 shows a diagram of a system including a device that supports a beam management procedure that supports MIMO transmissions in accordance with one or more aspects of the present disclosure.

FIG. 7 shows a diagram of a system 700 including a device 705 that supports a beam management procedure that supports MIMO transmissions in accordance with one or more aspects of the present disclosure. The device 705 may be an example of or include components of a device 405, a device 505, or a UE 115 as described herein. The device 705 may communicate (e.g., wirelessly) with one or more other devices (e.g., network entities 105, UEs 115, or a combination thereof). The device 705 may include components for bi-directional voice and data communications including components for transmitting and receiving communications, such as a communications manager 720, an input/output (I/O) controller, such as an I/O controller 710, a transceiver 715, one or more antennas 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna. However, in some other cases, the device 705 may have more than one antenna, which may be capable of concurrently transmitting or receiving multiple wireless transmissions. The transceiver 715 may communicate bi-directionally via the one or more antennas 725 using wired or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable, or processor-executable code, such as the code 735. The code 735 may include instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may include, among other things, a basic I/O system (BIOS) which may control basic hardware or software operation such as the interaction with peripheral components or devices.

The at least one processor 740 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting a beam management procedure that supports MIMO transmissions). For example, the device 705 or a component of the device 705 may include at least one processor 740 and at least one memory 730 coupled with or to the at least one processor 740, the at least one processor 740 and the at least one memory 730 configured to perform various functions described herein.

In some examples, the at least one processor 740 may include multiple processors and the at least one memory 730 may include multiple memories. One or more of the multiple processors may be coupled with one or more of the multiple memories, which may, individually or collectively, be configured to perform various functions described herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. For example, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code 735 (e.g., processor-executable code) stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for receiving first signaling indicating a set of multiple configurations including a first configuration and a second configuration, the first configuration indicating a first resource set that corresponds to a first set of multiple transmit beams associated with a network entity and a second resource set that corresponds to a second set of multiple transmit beams associated with the network entity, and the second configuration indicating a third resource set. The communications manager 720 is capable of, configured to, or operable to support a means for receiving, based on the first configuration, a first set of multiple reference signals using the first resource set and a first set of multiple receive beams associated with the UE. The communications manager 720 is capable of, configured to, or operable to support a means for receiving, based on the first configuration, a second set of multiple reference signals using the second resource set and a second set of multiple receive beams. The communications manager 720 is capable of, configured to, or operable to support a means for transmitting a first report indicating a first beam pair and a second beam pair, the first beam pair including a first transmit beam of the first set of multiple transmit beams and a first receive beam of the first set of multiple receive beams and the second beam pair including a second transmit beam of the second set of multiple transmit beams and a second receive beam of the second set of multiple receive beams. The communications manager 720 is capable of, configured to, or operable to support a means for receiving, based on the first report, a third set of multiple reference signals using the first receive beam, the second receive beam, and the third resource set. The communications manager 720 is capable of, configured to, or operable to support a means for transmitting a second report including a parameter indicative of a correlation between the first beam pair and the second beam pair, the parameter based on the first report and the third set of multiple reference signals.

By including or configuring the communications manager 720 in accordance with examples as described herein, the device 705 may support techniques for improved communication reliability, reduced latency, and improved coordination between devices.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of a beam management procedure that supports MIMO transmissions as described herein, or the at least one processor 740 and the at least one memory 730 may be otherwise configured to, individually or collectively, perform or support such operations.

Figure 8:
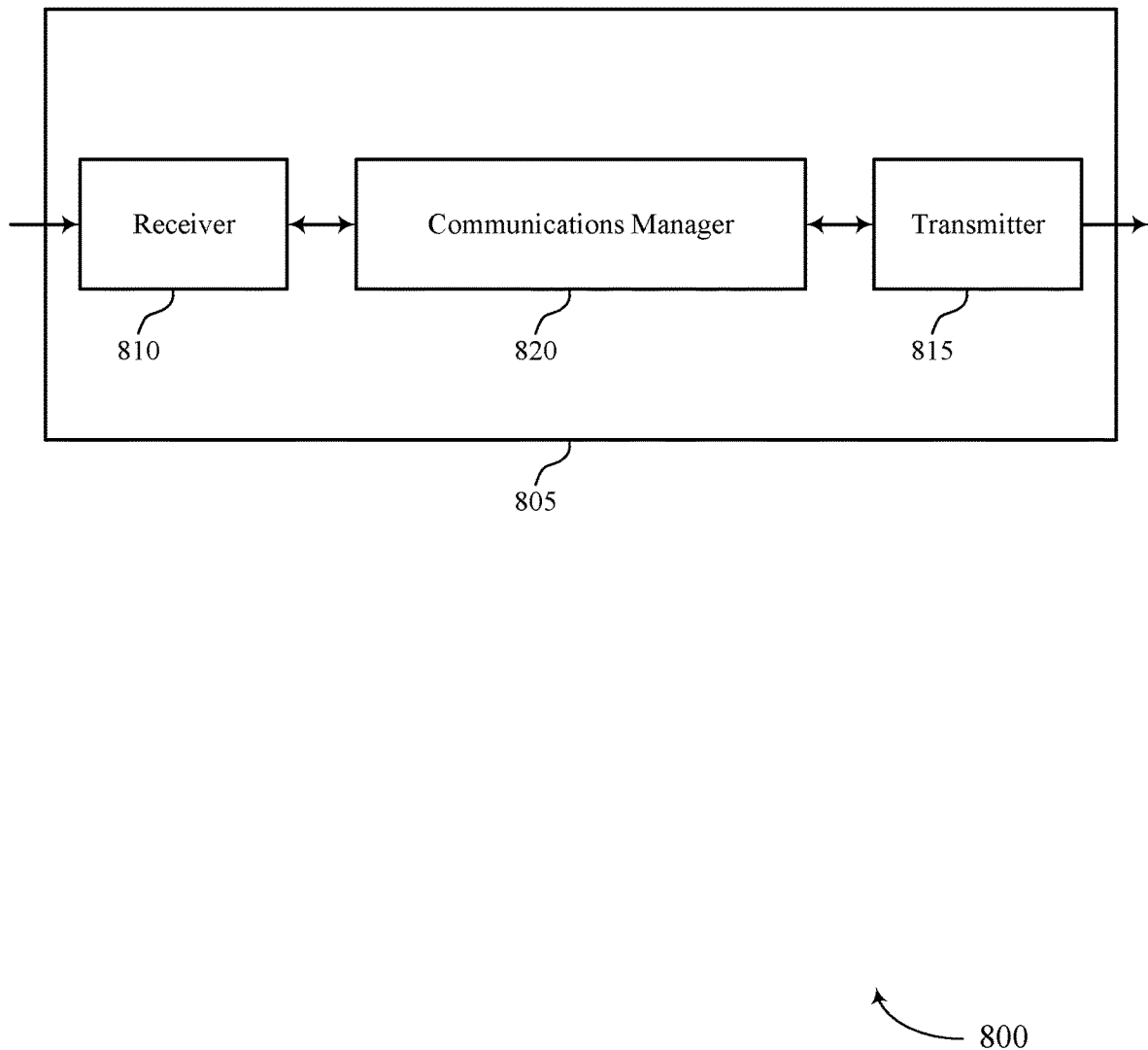
FIGS. 8 and 9 show block diagrams of devices that support a beam management procedure that supports MIMO transmissions in accordance with one or more aspects of the present disclosure.

FIG. 8 shows a block diagram 800 of a device 805 that supports a beam management procedure that supports MIMO transmissions in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations or components thereof may be examples of means for performing various aspects of a beam management procedure that supports MIMO transmissions as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor (e.g., referred to as a processor-executable code). If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for transmitting first signaling indicating a set of multiple configurations including a first configuration and a second configuration, the first configuration indicating a first resource set that corresponds to a first set of multiple transmit beams associated with the network entity and a second resource set that corresponds to a second set of multiple transmit beams associated with the network entity and the second configuration indicating a third resource set. The communications manager 820 is capable of, configured to, or operable to support a means for transmitting, based on the first configuration, a first set of multiple reference signals using the first resource set and the first set of multiple transmit beams. The communications manager 820 is capable of, configured to, or operable to support a means for transmitting, based on the first configuration, a second set of multiple reference signals using the second resource set and the second set of multiple transmit beams. The communications manager 820 is capable of, configured to, or operable to support a means for receiving a first report indicating a first beam pair and a second beam pair, the first beam pair including a first transmit beam of the first set of multiple transmit beams and a first receive beam of a first set of multiple receive beams associated with a UE and the second beam pair including a second transmit beam of the second set of multiple transmit beams and a second receive beam of a second set of multiple receive beams associated with the UE. The communications manager 820 is capable of, configured to, or operable to support a means for transmitting, based on the first report, a third set of multiple reference signals using the first transmit beam, the second transmit beam, and the third resource set. The communications manager 820 is capable of, configured to, or operable to support a means for receiving a second report including a parameter indicative of a correlation between the first beam pair and the second beam pair, the parameter based on the first report and the third set of multiple reference signals.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for reduced processing.

Figure 9:
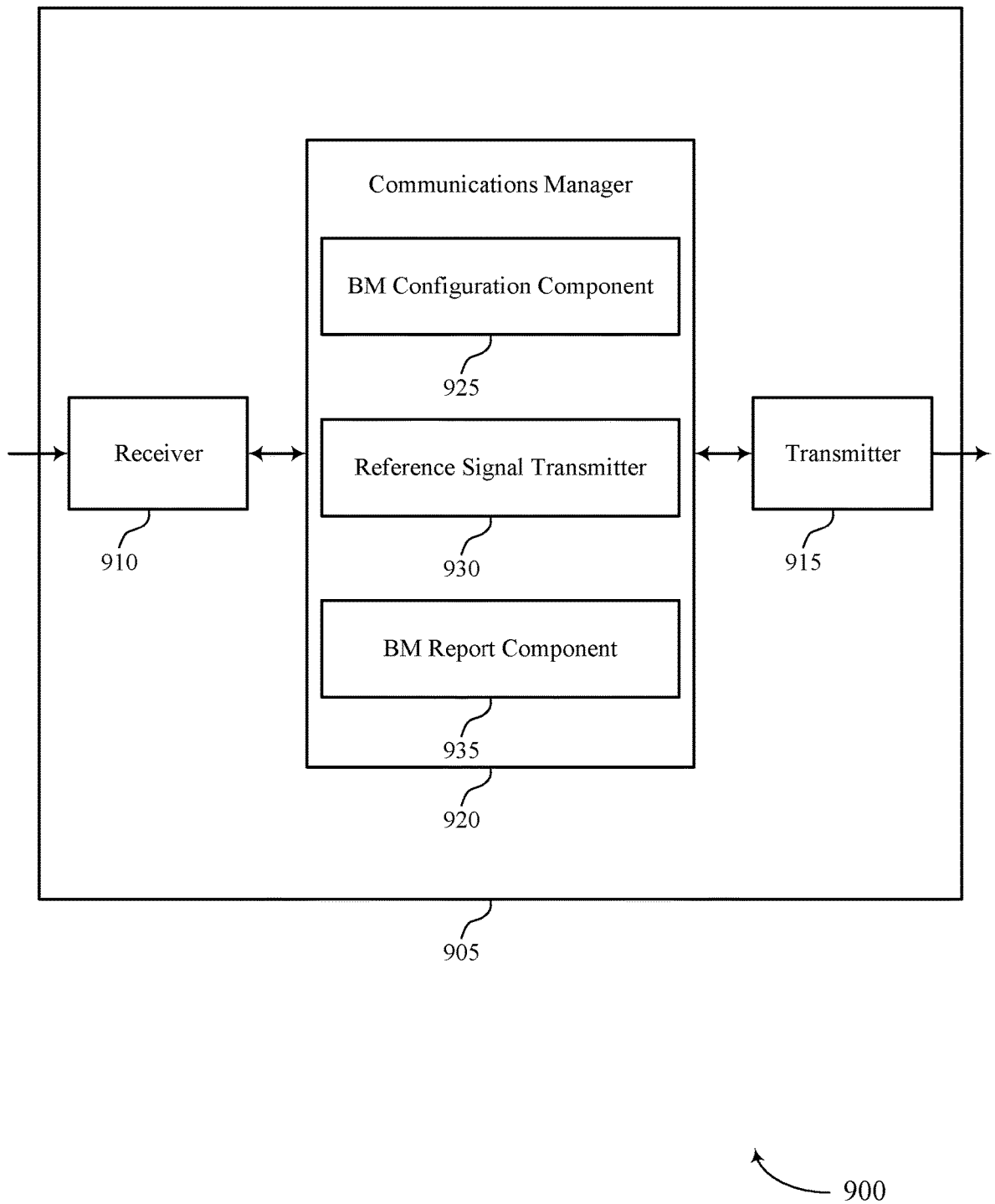

FIG. 9 shows a block diagram 900 of a device 905 that supports a beam management procedure that supports MIMO transmissions in accordance with one or more aspects of the present disclosure. The device 905 may be an example of aspects of a device 805 or a network entity 105 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of a beam management procedure that supports MIMO transmissions as described herein. For example, the communications manager 920 may include a BM configuration component 925, a reference signal transmitter 930, a BM report component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The BM configuration component 925 is capable of, configured to, or operable to support a means for transmitting first signaling indicating a set of multiple configurations including a first configuration and a second configuration, the first configuration indicating a first resource set that corresponds to a first set of multiple transmit beams associated with the network entity and a second resource set that corresponds to a second set of multiple transmit beams associated with the network entity and the second configuration indicating a third resource set. The reference signal transmitter 930 is capable of, configured to, or operable to support a means for transmitting, based on the first configuration, a first set of multiple reference signals using the first resource set and the first set of multiple transmit beams. The reference signal transmitter 930 is capable of, configured to, or operable to support a means for transmitting, based on the first configuration, a second set of multiple reference signals using the second resource set and the second set of multiple transmit beams. The BM report component 935 is capable of, configured to, or operable to support a means for receiving a first report indicating a first beam pair and a second beam pair, the first beam pair including a first transmit beam of the first set of multiple transmit beams and a first receive beam of a first set of multiple receive beams associated with a UE and the second beam pair including a second transmit beam of the second set of multiple transmit beams and a second receive beam of a second set of multiple receive beams associated with the UE. The reference signal transmitter 930 is capable of, configured to, or operable to support a means for transmitting, based on the first report, a third set of multiple reference signals using the first transmit beam, the second transmit beam, and the third resource set. The BM report component 935 is capable of, configured to, or operable to support a means for receiving a second report including a parameter indicative of a correlation between the first beam pair and the second beam pair, the parameter based on the first report and the third set of multiple reference signals.

Figure 10:
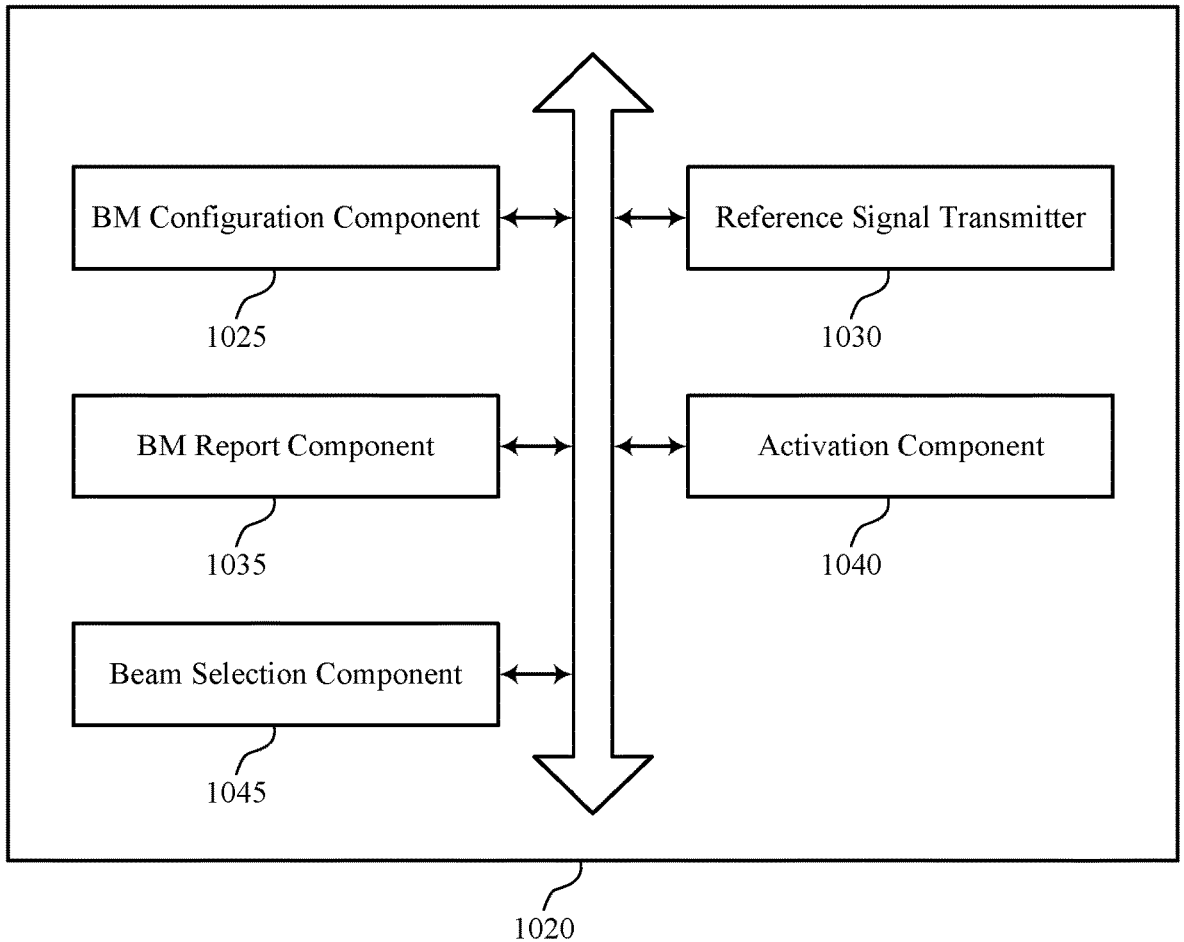
FIG. 10 shows a block diagram of a communications manager that supports a beam management procedure that supports MIMO transmissions in accordance with one or more aspects of the present disclosure.

FIG. 10 shows a block diagram 1000 of a communications manager 1020 that supports a beam management procedure that supports MIMO transmissions in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of a beam management procedure that supports MIMO transmissions as described herein. For example, the communications manager 1020 may include a BM configuration component 1025, a reference signal transmitter 1030, a BM report component 1035, an activation component 1040, a beam selection component 1045, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. The BM configuration component 1025 is capable of, configured to, or operable to support a means for transmitting first signaling indicating a set of multiple configurations including a first configuration and a second configuration, the first configuration indicating a first resource set that corresponds to a first set of multiple transmit beams associated with the network entity and a second resource set that corresponds to a second set of multiple transmit beams associated with the network entity and the second configuration indicating a third resource set. The reference signal transmitter 1030 is capable of, configured to, or operable to support a means for transmitting, based on the first configuration, a first set of multiple reference signals using the first resource set and the first set of multiple transmit beams. In some examples, the reference signal transmitter 1030 is capable of, configured to, or operable to support a means for transmitting, based on the first configuration, a second set of multiple reference signals using the second resource set and the second set of multiple transmit beams. The BM report component 1035 is capable of, configured to, or operable to support a means for receiving a first report indicating a first beam pair and a second beam pair, the first beam pair including a first transmit beam of the first set of multiple transmit beams and a first receive beam of a first set of multiple receive beams associated with a UE and the second beam pair including a second transmit beam of the second set of multiple transmit beams and a second receive beam of a second set of multiple receive beams associated with the UE. In some examples, the reference signal transmitter 1030 is capable of, configured to, or operable to support a means for transmitting, based on the first report, a third set of multiple reference signals using the first transmit beam, the second transmit beam, and the third resource set. In some examples, the BM report component 1035 is capable of, configured to, or operable to support a means for receiving a second report including a parameter indicative of a correlation between the first beam pair and the second beam pair, the parameter based on the first report and the third set of multiple reference signals.

In some examples, the activation component 1040 is capable of, configured to, or operable to support a means for transmitting, based on the first report, second signaling indicating one or more values associated with the third resource set, where transmitting the third set of multiple reference signals is based on the one or more values.

In some examples, the one or more values include one or more transmission configuration indication states, a signal to noise ratio value that is based on the first report, a number of data streams that is based on the first report, or a combination thereof.

In some examples, the beam selection component 1045 is capable of, configured to, or operable to support a means for transmitting, based on the second report, second signaling indicating for the UE to utilize the first beam pair and the second beam pair for multiple-input multiple-output communications between the UE and the network entity. In some examples, the second signaling is included in downlink control information. In some examples, the second configuration further includes a fourth resource set.

In some examples, the first report further indicates a third beam pair, and the reference signal transmitter 1030 is capable of, configured to, or operable to support a means for transmitting, based on the first report, a fourth set of multiple reference signals using the third transmit beam, the fourth resource set, and one of the first transmit beam or the second transmit beam.

In some examples, the first report further indicates a third beam pair and a fourth beam pair, and the reference signal transmitter 1030 is capable of, configured to, or operable to support a means for transmitting, based on the first report, a fourth set of multiple reference signals using the third transmit beam, the fourth transmit beam, and the fourth resource set, where the second report further includes a second parameter indicative of a correlation between the third beam pair and the fourth beam pair, the second parameter based on the first report, and the fourth set of multiple reference signals.

In some examples, the second configuration includes a periodicity associated with the third resource set. In some examples, the first report further indicates a third beam pair, the third beam pair including a third transmit beam of a third set of multiple transmit beams and a third receive beam of a third set of multiple receive beams.

In some examples, the network entity transmits the third set of multiple reference signals during a first periodic occasion of the third resource set according to the periodicity, and the reference signal transmitter 1030 is capable of, configured to, or operable to support a means for transmitting a fourth set of multiple reference signals using the third transmit beam and one of the first transmit beam or the second transmit beam during a second periodic occasion of the third resource set according to the periodicity.

In some examples, the network entity includes a first antenna panel configured to use the first set of multiple transmit beams and a second antenna panel configured to use the second set of multiple transmit beams. In some examples, the user equipment includes a third antenna panel configured to use the first set of multiple receive beams and a fourth antenna panel configured to use the second set of multiple receive beams.

Figure 11:
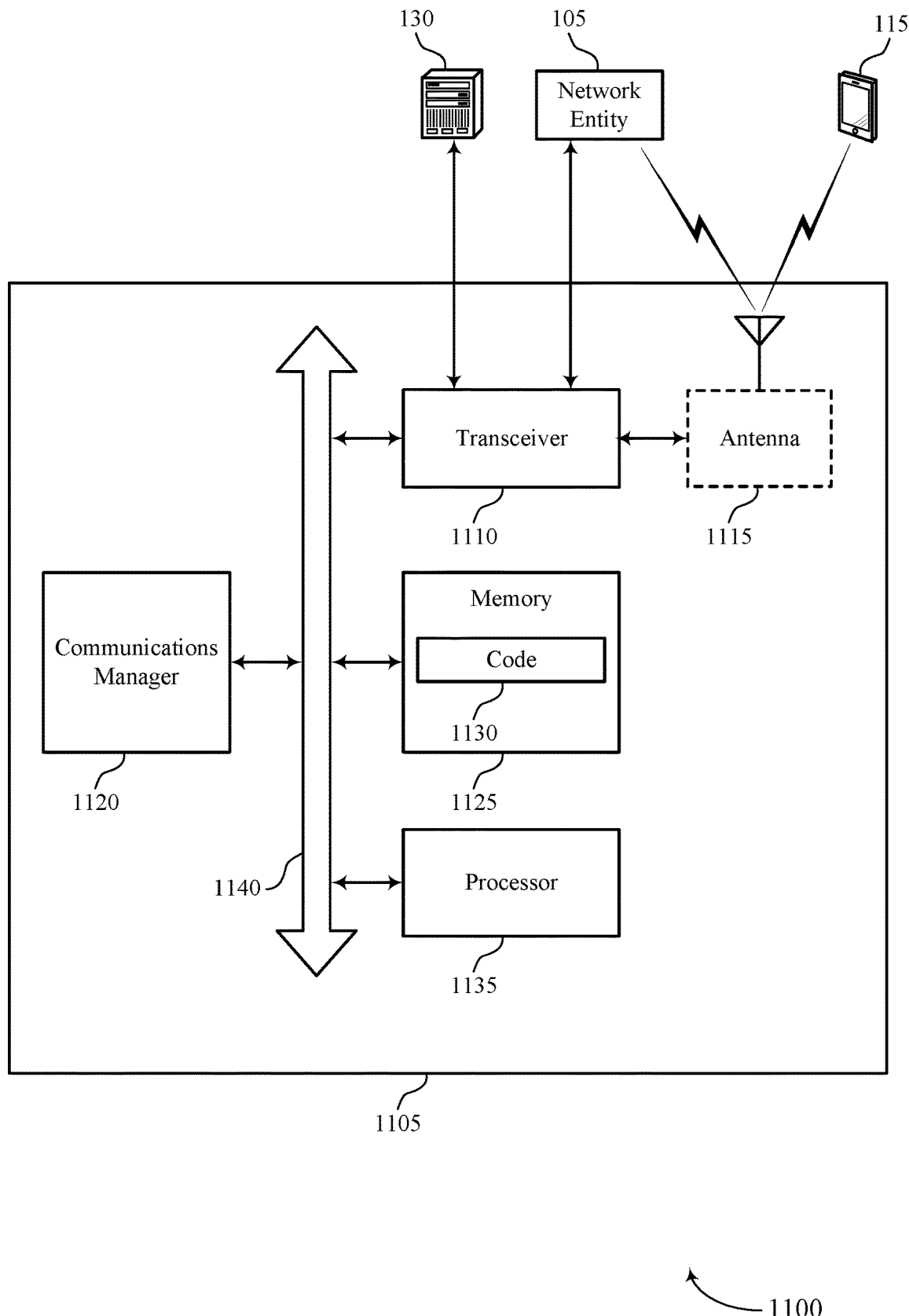
FIG. 11 shows a diagram of a system including a device that supports a beam management procedure that supports MIMO transmissions in accordance with one or more aspects of the present disclosure.

FIG. 11 shows a diagram of a system 1100 including a device 1105 that supports a beam management procedure that supports MIMO transmissions in accordance with one or more aspects of the present disclosure. The device 1105 may be an example of or include components of a device 805, a device 905, or a network entity 105 as described herein. The device 1105 may communicate with other network devices or network equipment such as one or more of the network entities 105, UEs 115, or any combination thereof. The communications may include communications over one or more wired interfaces, over one or more wireless interfaces, or any combination thereof. The device 1105 may include components that support outputting and obtaining communications, such as a communications manager 1120, a transceiver 1110, one or more antennas 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., communication link(s) 125, backhaul communication link(s) 120, a midhaul communication link 162, a fronthaul communication link 168).

The at least one memory 1125 may include RAM, ROM, or any combination thereof. The at least one memory 1125 may store computer-readable, computer-executable, or processor-executable code, such as the code 1130. The code 1130 may include instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may include, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting a beam management procedure that supports MIMO transmissions). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125).

In some examples, the at least one processor 1135 may include multiple processors and the at least one memory 1125 may include multiple memories. One or more of the multiple processors may be coupled with one or more of the multiple memories, which may, individually or collectively, be configured to perform various functions herein. In some examples, the at least one processor 1135 may be a component of a processing system, which may refer to a system (such as a series) of machines, circuitry (including, for example, one or both of processor circuitry (which may include the at least one processor 1135) and memory circuitry (which may include the at least one memory 1125)), or components, that receives or obtains inputs and processes the inputs to produce, generate, or obtain a set of outputs. The processing system may be configured to perform one or more of the functions described herein. For example, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with one or more other network entities 105, and may include a controller or scheduler for controlling communications with UEs 115 (e.g., in cooperation with the one or more other network devices). In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for transmitting first signaling indicating a set of multiple configurations including a first configuration and a second configuration, the first configuration indicating a first resource set that corresponds to a first set of multiple transmit beams associated with the network entity and a second resource set that corresponds to a second set of multiple transmit beams associated with the network entity and the second configuration indicating a third resource set. The communications manager 1120 is capable of, configured to, or operable to support a means for transmitting, based on the first configuration, a first set of multiple reference signals using the first resource set and the first set of multiple transmit beams. The communications manager 1120 is capable of, configured to, or operable to support a means for transmitting, based on the first configuration, a second set of multiple reference signals using the second resource set and the second set of multiple transmit beams. The communications manager 1120 is capable of, configured to, or operable to support a means for receiving a first report indicating a first beam pair and a second beam pair, the first beam pair including a first transmit beam of the first set of multiple transmit beams and a first receive beam of a first set of multiple receive beams associated with a UE and the second beam pair including a second transmit beam of the second set of multiple transmit beams and a second receive beam of a second set of multiple receive beams associated with the UE. The communications manager 1120 is capable of, configured to, or operable to support a means for transmitting, based on the first report, a third set of multiple reference signals using the first transmit beam, the second transmit beam, and the third resource set. The communications manager 1120 is capable of, configured to, or operable to support a means for receiving a second report including a parameter indicative of a correlation between the first beam pair and the second beam pair, the parameter based on the first report and the third set of multiple reference signals.

By including or configuring the communications manager 1120 in accordance with examples as described herein, the device 1105 may support techniques for improved communication reliability, reduced latency, and improved coordination between devices.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of a beam management procedure that supports MIMO transmissions as described herein, or the at least one processor 1135 and the at least one memory 1125 may be otherwise configured to, individually or collectively, perform or support such operations.

Figure 12:
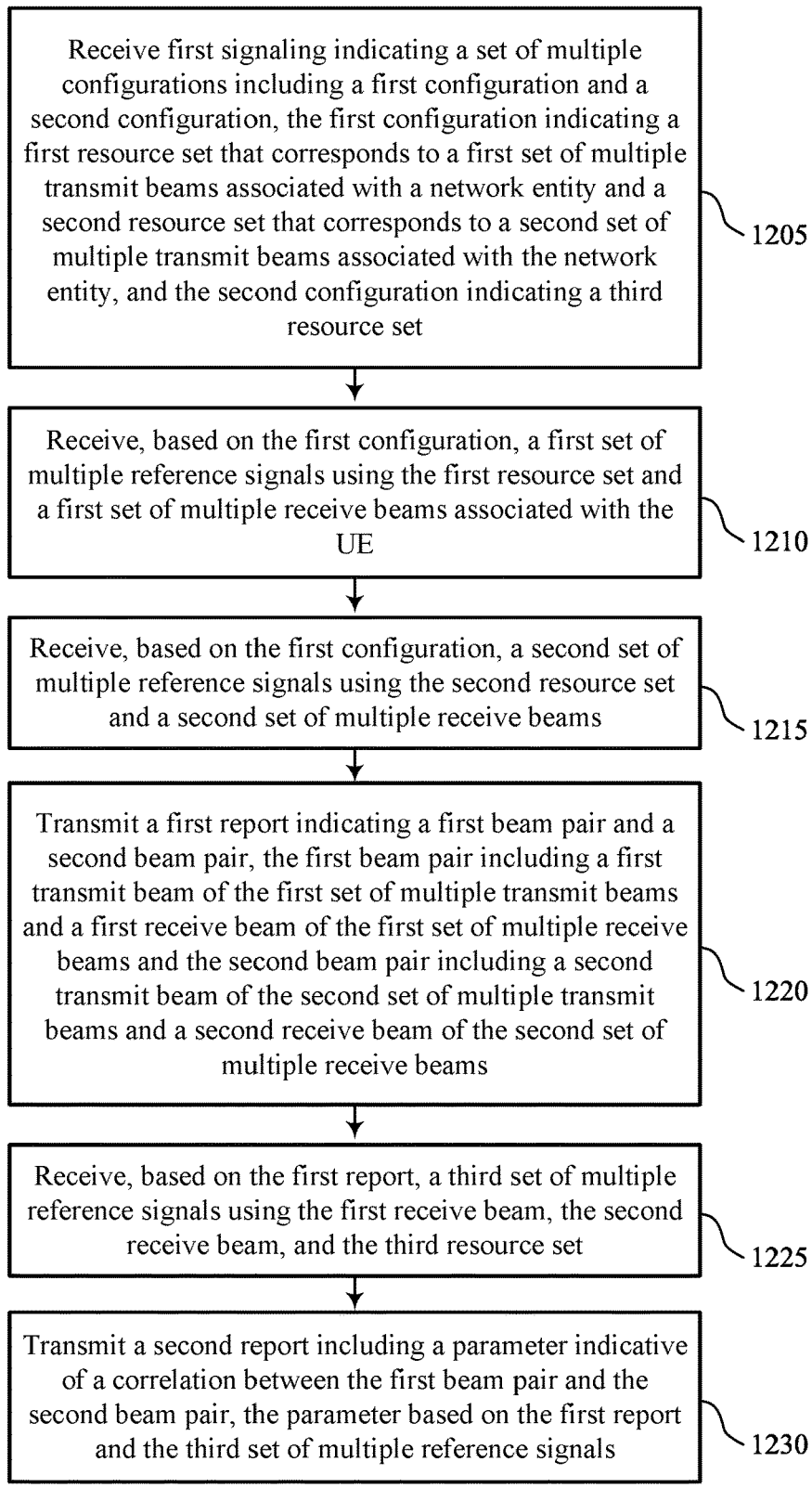
FIGS. 12 through 15 show flowcharts illustrating methods that support a beam management procedure that supports MIMO transmissions in accordance with one or more aspects of the present disclosure.

FIG. 12 shows a flowchart illustrating a method 1200 that supports a beam management procedure that supports MIMO transmissions in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving first signaling indicating a set of multiple configurations including a first configuration and a second configuration, the first configuration indicating a first resource set that corresponds to a first set of multiple transmit beams associated with a network entity and a second resource set that corresponds to a second set of multiple transmit beams associated with the network entity, and the second configuration indicating a third resource set. The operations of 1205 may be performed in accordance with examples as disclosed herein. In some examples, aspects of the operations of 1205 may be performed by a UE BM configuration component 625 as described with reference to FIG. 6.

At 1210, the method may include receiving, based on the first configuration, a first set of multiple reference signals using the first resource set and a first set of multiple receive beams associated with the UE. The operations of 1210 may be performed in accordance with examples as disclosed herein. In some examples, aspects of the operations of 1210 may be performed by a reference signal receiver 630 as described with reference to FIG. 6.

At 1215, the method may include receiving, based on the first configuration, a second set of multiple reference signals using the second resource set and a second set of multiple receive beams. The operations of 1215 may be performed in accordance with examples as disclosed herein. In some examples, aspects of the operations of 1215 may be performed by a reference signal receiver 630 as described with reference to FIG. 6.

At 1220, the method may include transmitting a first report indicating a first beam pair and a second beam pair, the first beam pair including a first transmit beam of the first set of multiple transmit beams and a first receive beam of the first set of multiple receive beams and the second beam pair including a second transmit beam of the second set of multiple transmit beams and a second receive beam of the second set of multiple receive beams. The operations of 1220 may be performed in accordance with examples as disclosed herein. In some examples, aspects of the operations of 1220 may be performed by a UE BM report component 635 as described with reference to FIG. 6.

At 1225, the method may include receiving, based on the first report, a third set of multiple reference signals using the first receive beam, the second receive beam, and the third resource set. The operations of 1225 may be performed in accordance with examples as disclosed herein. In some examples, aspects of the operations of 1225 may be performed by a reference signal receiver 630 as described with reference to FIG. 6.

At 1230, the method may include transmitting a second report including a parameter indicative of a correlation between the first beam pair and the second beam pair, the parameter based on the first report and the third set of multiple reference signals. The operations of 1230 may be performed in accordance with examples as disclosed herein. In some examples, aspects of the operations of 1230 may be performed by a UE BM report component 635 as described with reference to FIG. 6.

Figure 13:
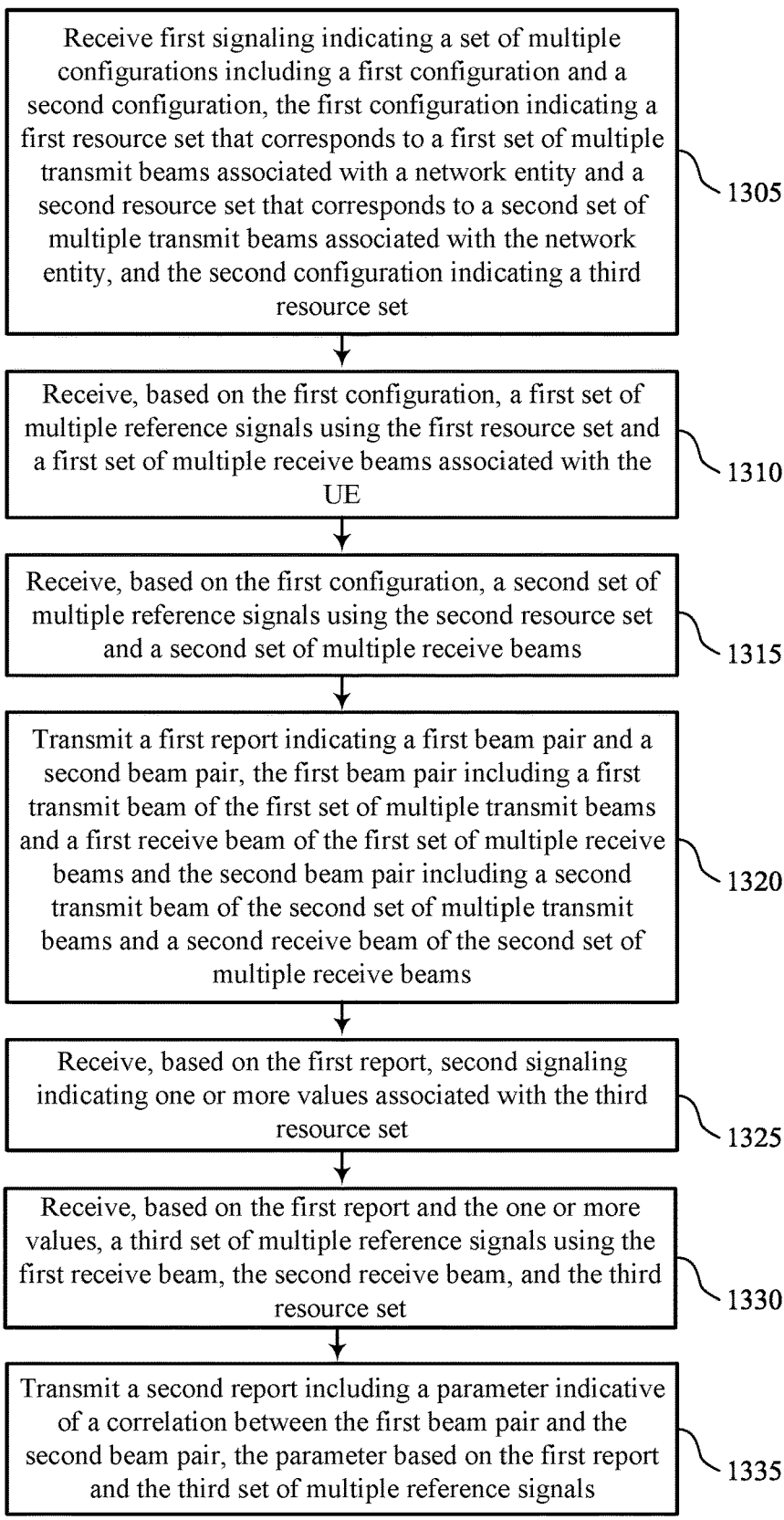

FIG. 13 shows a flowchart illustrating a method 1300 that supports a beam management procedure that supports MIMO transmissions in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving first signaling indicating a set of multiple configurations including a first configuration and a second configuration, the first configuration indicating a first resource set that corresponds to a first set of multiple transmit beams associated with a network entity and a second resource set that corresponds to a second set of multiple transmit beams associated with the network entity, and the second configuration indicating a third resource set. The operations of 1305 may be performed in accordance with examples as disclosed herein. In some examples, aspects of the operations of 1305 may be performed by a UE BM configuration component 625 as described with reference to FIG. 6.

At 1310, the method may include receiving, based on the first configuration, a first set of multiple reference signals using the first resource set and a first set of multiple receive beams associated with the UE. The operations of 1310 may be performed in accordance with examples as disclosed herein. In some examples, aspects of the operations of 1310 may be performed by a reference signal receiver 630 as described with reference to FIG. 6.

At 1315, the method may include receiving, based on the first configuration, a second set of multiple reference signals using the second resource set and a second set of multiple receive beams. The operations of 1315 may be performed in accordance with examples as disclosed herein. In some examples, aspects of the operations of 1315 may be performed by a reference signal receiver 630 as described with reference to FIG. 6.

At 1320, the method may include transmitting a first report indicating a first beam pair and a second beam pair, the first beam pair including a first transmit beam of the first set of multiple transmit beams and a first receive beam of the first set of multiple receive beams and the second beam pair including a second transmit beam of the second set of multiple transmit beams and a second receive beam of the second set of multiple receive beams. The operations of 1320 may be performed in accordance with examples as disclosed herein. In some examples, aspects of the operations of 1320 may be performed by a UE BM report component 635 as described with reference to FIG. 6.

At 1325, the method may include receiving, based on the first report, second signaling indicating one or more values associated with the third resource set. The operations of 1325 may be performed in accordance with examples as disclosed herein. In some examples, aspects of the operations of 1325 may be performed by a UE activation component 640 as described with reference to FIG. 6.

At 1330, the method may include receiving, based on the first report and the one or more values, a third set of multiple reference signals using the first receive beam, the second receive beam, and the third resource set. The operations of 1330 may be performed in accordance with examples as disclosed herein. In some examples, aspects of the operations of 1330 may be performed by a reference signal receiver 630 as described with reference to FIG. 6.

At 1335, the method may include transmitting a second report including a parameter indicative of a correlation between the first beam pair and the second beam pair, the parameter based on the first report and the third set of multiple reference signals. The operations of 1335 may be performed in accordance with examples as disclosed herein. In some examples, aspects of the operations of 1335 may be performed by a UE BM report component 635 as described with reference to FIG. 6.

Figure 14:
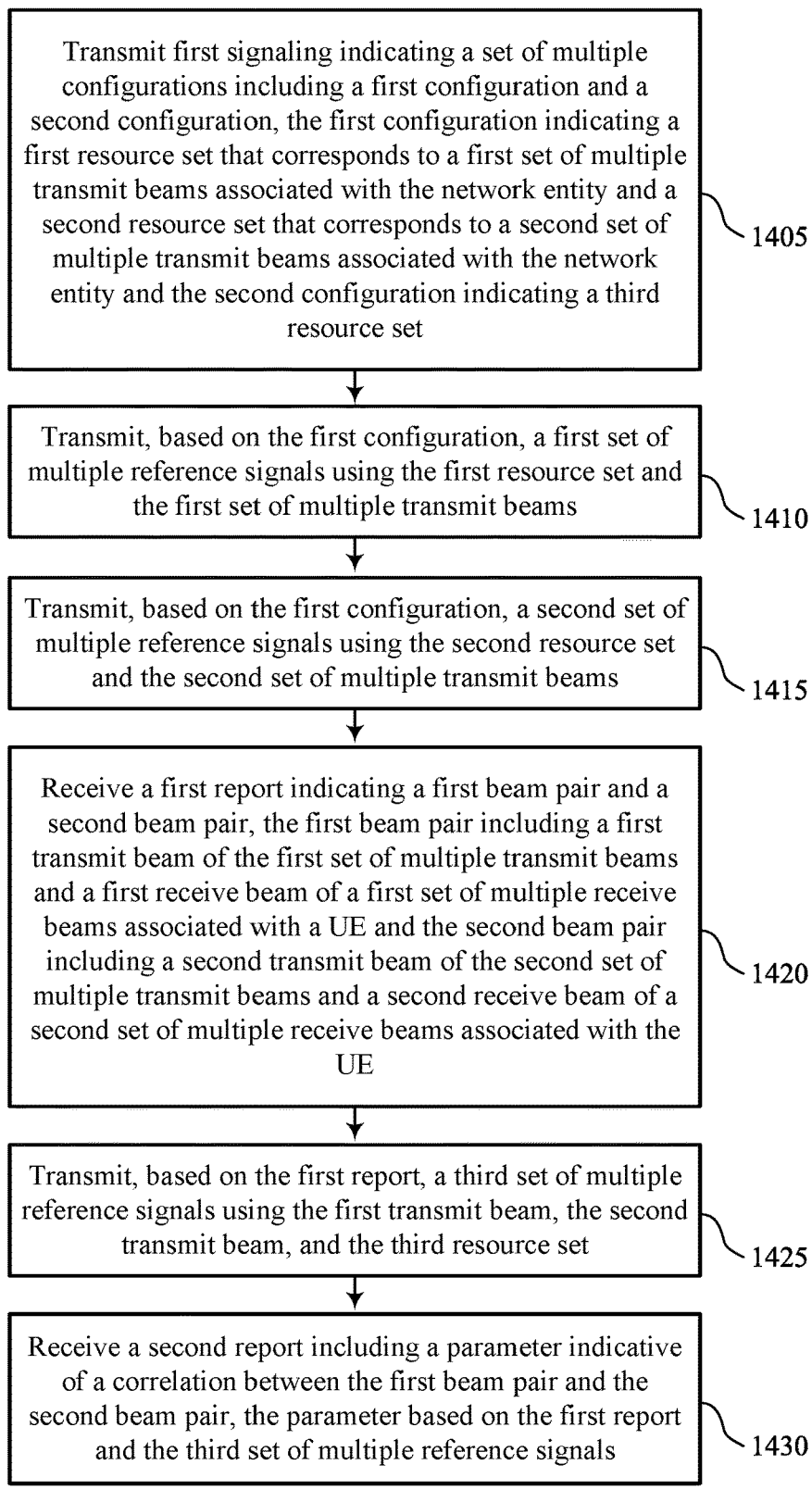

FIG. 14 shows a flowchart illustrating a method 1400 that supports a beam management procedure that supports MIMO transmissions in accordance with one or more aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include transmitting first signaling indicating a set of multiple configurations including a first configuration and a second configuration, the first configuration indicating a first resource set that corresponds to a first set of multiple transmit beams associated with the network entity and a second resource set that corresponds to a second set of multiple transmit beams associated with the network entity and the second configuration indicating a third resource set. The operations of 1405 may be performed in accordance with examples as disclosed herein. In some examples, aspects of the operations of 1405 may be performed by a BM configuration component 1025 as described with reference to FIG. 10.

At 1410, the method may include transmitting, based on the first configuration, a first set of multiple reference signals using the first resource set and the first set of multiple transmit beams. The operations of 1410 may be performed in accordance with examples as disclosed herein. In some examples, aspects of the operations of 1410 may be performed by a reference signal transmitter 1030 as described with reference to FIG. 10.

At 1415, the method may include transmitting, based on the first configuration, a second set of multiple reference signals using the second resource set and the second set of multiple transmit beams. The operations of 1415 may be performed in accordance with examples as disclosed herein. In some examples, aspects of the operations of 1415 may be performed by a reference signal transmitter 1030 as described with reference to FIG. 10.

At 1420, the method may include receiving a first report indicating a first beam pair and a second beam pair, the first beam pair including a first transmit beam of the first set of multiple transmit beams and a first receive beam of a first set of multiple receive beams associated with a UE and the second beam pair including a second transmit beam of the second set of multiple transmit beams and a second receive beam of a second set of multiple receive beams associated with the UE. The operations of 1420 may be performed in accordance with examples as disclosed herein. In some examples, aspects of the operations of 1420 may be performed by a BM report component 1035 as described with reference to FIG. 10.

At 1425, the method may include transmitting, based on the first report, a third set of multiple reference signals using the first transmit beam, the second transmit beam, and the third resource set. The operations of 1425 may be performed in accordance with examples as disclosed herein. In some examples, aspects of the operations of 1425 may be performed by a reference signal transmitter 1030 as described with reference to FIG. 10.

At 1430, the method may include receiving a second report including a parameter indicative of a correlation between the first beam pair and the second beam pair, the parameter based on the first report and the third set of multiple reference signals. The operations of 1430 may be performed in accordance with examples as disclosed herein. In some examples, aspects of the operations of 1430 may be performed by a BM report component 1035 as described with reference to FIG. 10.

Figure 15:
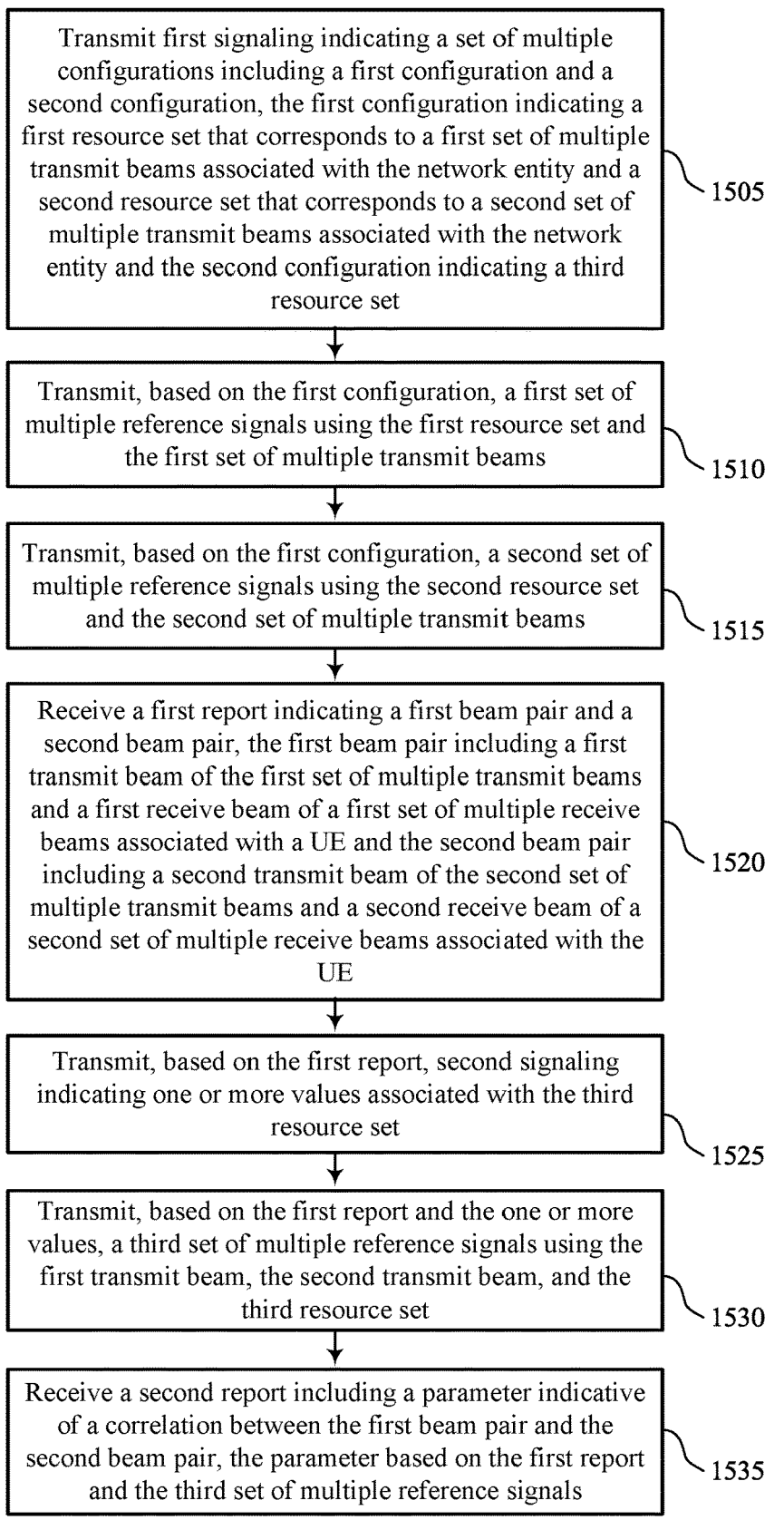

FIG. 15 shows a flowchart illustrating a method 1500 that supports a beam management procedure that supports MIMO transmissions in accordance with one or more aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include transmitting first signaling indicating a set of multiple configurations including a first configuration and a second configuration, the first configuration indicating a first resource set that corresponds to a first set of multiple transmit beams associated with the network entity and a second resource set that corresponds to a second set of multiple transmit beams associated with the network entity and the second configuration indicating a third resource set. The operations of 1505 may be performed in accordance with examples as disclosed herein. In some examples, aspects of the operations of 1505 may be performed by a BM configuration component 1025 as described with reference to FIG. 10.

At 1510, the method may include transmitting, based on the first configuration, a first set of multiple reference signals using the first resource set and the first set of multiple transmit beams. The operations of 1510 may be performed in accordance with examples as disclosed herein. In some examples, aspects of the operations of 1510 may be performed by a reference signal transmitter 1030 as described with reference to FIG. 10.

At 1515, the method may include transmitting, based on the first configuration, a second set of multiple reference signals using the second resource set and the second set of multiple transmit beams. The operations of 1515 may be performed in accordance with examples as disclosed herein. In some examples, aspects of the operations of 1515 may be performed by a reference signal transmitter 1030 as described with reference to FIG. 10.

At 1520, the method may include receiving a first report indicating a first beam pair and a second beam pair, the first beam pair including a first transmit beam of the first set of multiple transmit beams and a first receive beam of a first set of multiple receive beams associated with a UE and the second beam pair including a second transmit beam of the second set of multiple transmit beams and a second receive beam of a second set of multiple receive beams associated with the UE. The operations of 1520 may be performed in accordance with examples as disclosed herein. In some examples, aspects of the operations of 1520 may be performed by a BM report component 1035 as described with reference to FIG. 10.

At 1525, the method may include transmitting, based on the first report, second signaling indicating one or more values associated with the third resource set. The operations of 1525 may be performed in accordance with examples as disclosed herein. In some examples, aspects of the operations of 1525 may be performed by an activation component 1040 as described with reference to FIG. 10.

At 1530, the method may include transmitting, based on the first report and the one or more values, a third set of multiple reference signals using the first transmit beam, the second transmit beam, and the third resource set. The operations of 1530 may be performed in accordance with examples as disclosed herein. In some examples, aspects of the operations of 1530 may be performed by a reference signal transmitter 1030 as described with reference to FIG. 10.

At 1535, the method may include receiving a second report including a parameter indicative of a correlation between the first beam pair and the second beam pair, the parameter based on the first report and the third set of multiple reference signals. The operations of 1535 may be performed in accordance with examples as disclosed herein. In some examples, aspects of the operations of 1535 may be performed by a BM report component 1035 as described with reference to FIG. 10.

The following provides an overview of aspects of the present disclosure:

Aspect 1: A method for wireless communications at a UE, comprising: receiving first signaling indicating a plurality of configurations comprising a first configuration and a second configuration, the first configuration indicating a first resource set that corresponds to a first plurality of transmit beams associated with a network entity and a second resource set that corresponds to a second plurality of transmit beams associated with the network entity, and the second configuration indicating a third resource set; receiving, based at least in part on the first configuration, a first plurality of reference signals using the first resource set and a first plurality of receive beams associated with the UE; receiving, based at least in part on the first configuration, a second plurality of reference signals using the second resource set and a second plurality of receive beams; transmitting a first report indicating a first beam pair and a second beam pair, the first beam pair comprising a first transmit beam of the first plurality of transmit beams and a first receive beam of the first plurality of receive beams and the second beam pair comprising a second transmit beam of the second plurality of transmit beams and a second receive beam of the second plurality of receive beams; receiving, based at least in part on the first report, a third plurality of reference signals using the first receive beam, the second receive beam, and the third resource set; and transmitting a second report comprising a parameter indicative of a correlation between the first beam pair and the second beam pair, the parameter based at least in part on the first report and the third plurality of reference signals.

Aspect 2: The method of aspect 1, further comprising: receiving, based at least in part on the first report, second signaling indicating one or more values associated with the third resource set, wherein receiving the third plurality of reference signals is based at least in part on the one or more values.

Aspect 3: The method of aspect 2, wherein the one or more values comprise one or more TCI states, a SNR value that is based at least in part on the first report, a number of data streams that is based at least in part on the first report, or a combination thereof.

Aspect 4: The method of aspect 3, further comprising: measuring an effective channel between the UE and the network entity based at least in part on the first report and the third plurality of reference signals; and determining the parameter based at least in part on the effective channel measurement, the SNR value, and the number of data streams.

Aspect 5: The method of any of aspects 1 through 4, further comprising: receiving, based at least in part on the second report, second signaling indicating for the UE to utilize the first beam pair and the second beam pair for MIMO communications between the UE and the network entity.

Aspect 6: The method of aspect 5, wherein the second signaling is included in DCI.

Aspect 7: The method of any of aspects 1 through 6, wherein the second configuration further comprises a fourth resource set.

Aspect 8: The method of aspect 7, wherein the first report further indicates a third beam pair, the third beam pair comprising a third transmit beam of a third plurality of transmit beams and a third receive beam of a third plurality of receive beams, the method further comprising: receiving, based at least in part on the first report, a fourth plurality of reference signals using the third receive beam, the fourth resource set, and one of the first receive beam or the second receive beam.

Aspect 9: The method of any of aspects 7 through 8, wherein the first report further indicates a third beam pair and a fourth beam pair, the third beam pair comprising a third transmit beam of the first plurality of transmit beams and a third receive beam of the first plurality of receive beams and the fourth beam pair comprising a fourth transmit beam of the second plurality of transmit beams and a fourth receive beam of the second plurality of receive beams, the method further comprising: receiving, based at least in part on the first report, a fourth plurality of reference signals using the third receive beam, the fourth receive beam, and the fourth resource set, wherein the second report further includes a second parameter indicative of a correlation between the third beam pair and the fourth beam pair, the second parameter based at least in part on the first report and the fourth plurality of reference signals.

Aspect 10: The method of any of aspects 1 through 9, wherein the second configuration comprises a periodicity associated with the third resource set, and the first report further indicates a third beam pair, the third beam pair comprising a third transmit beam of a third plurality of transmit beams and a third receive beam of a third plurality of receive beams.

Aspect 11: The method of aspect 10, wherein the UE receives the third plurality of reference signals during a first periodic occasion of the third resource set according to the periodicity, the method further comprising: receiving a fourth plurality of reference signals using the third receive beam and one of the first receive beam or the second receive beam during a second periodic occasion of the third resource set according to the periodicity.

Aspect 12: The method of any of aspects 1 through 11, wherein the network entity comprises a first antenna panel configured to use the first plurality of transmit beams and a second antenna panel configured to use the second plurality of transmit beams, and the user equipment comprises a third antenna panel configured to use the first plurality of receive beams and a fourth antenna panel configured to use the second plurality of receive beams.

Aspect 13: A method for wireless communications at a network entity, comprising: transmitting first signaling indicating a plurality of configurations comprising a first configuration and a second configuration, the first configuration indicating a first resource set that corresponds to a first plurality of transmit beams associated with the network entity and a second resource set that corresponds to a second plurality of transmit beams associated with the network entity and the second configuration indicating a third resource set; transmitting, based at least in part on the first configuration, a first plurality of reference signals using the first resource set and the first plurality of transmit beams; transmitting, based at least in part on the first configuration, a second plurality of reference signals using the second resource set and the second plurality of transmit beams; receiving a first report indicating a first beam pair and a second beam pair, the first beam pair comprising a first transmit beam of the first plurality of transmit beams and a first receive beam of a first plurality of receive beams associated with a UE and the second beam pair comprising a second transmit beam of the second plurality of transmit beams and a second receive beam of a second plurality of receive beams associated with the UE; transmitting, based at least in part on the first report, a third plurality of reference signals using the first transmit beam, the second transmit beam, and the third resource set; and receiving a second report comprising a parameter indicative of a correlation between the first beam pair and the second beam pair, the parameter based at least in part on the first report and the third plurality of reference signals.

Aspect 14: The method of aspect 13, further comprising: transmitting, based at least in part on the first report, second signaling indicating one or more values associated with the third resource set, wherein transmitting the third plurality of reference signals is based at least in part on the one or more values.

Aspect 15: The method of aspect 14, wherein the one or more values comprise one or more TCI states, a SNR value that is based at least in part on the first report, a number of data streams that is based at least in part on the first report, or a combination thereof.

Aspect 16: The method of any of aspects 13 through 15, further comprising: transmitting, based at least in part on the second report, second signaling indicating for the UE to utilize the first beam pair and the second beam pair for MIMO communications between the UE and the network entity.

Aspect 17: The method of aspect 16, wherein the second signaling is included in DCI.

Aspect 18: The method of any of aspects 13 through 17, wherein the second configuration further comprises a fourth resource set.

Aspect 19: The method of aspect 18, wherein the first report further indicates a third beam pair, the third beam pair comprising a third transmit beam of a third plurality of transmit beams and a third receive beam of a third plurality of receive beams, the method further comprising: transmitting, based at least in part on the first report, a fourth plurality of reference signals using the third transmit beam, the fourth resource set, and one of the first transmit beam or the second transmit beam.

Aspect 20: The method of any of aspects 18 through 19, wherein the first report further indicates a third beam pair and a fourth beam pair, the third beam pair comprising a third transmit beam of the first plurality of transmit beams and a third receive beam of the first plurality of receive beams and the fourth beam pair comprising a fourth transmit beam of the second plurality of transmit beams and a fourth receive beam of the second plurality of receive beams, the method further comprising: transmitting, based at least in part on the first report, a fourth plurality of reference signals using the third transmit beam, the fourth transmit beam, and the fourth resource set, wherein the second report further includes a second parameter indicative of a correlation between the third beam pair and the fourth beam pair, the second parameter based at least in part on the first report, and the fourth plurality of reference signals.

Aspect 21: The method of aspect 13, wherein the second configuration comprises a periodicity associated with the third resource set, and the first report further indicates a third beam pair, the third beam pair comprising a third transmit beam of a third plurality of transmit beams and a third receive beam of a third plurality of receive beams.

Aspect 22: The method of aspect 21, wherein the network entity transmits the third plurality of reference signals during a first periodic occasion of the third resource set according to the periodicity, the method further comprising: transmitting a fourth plurality of reference signals using the third transmit beam and one of the first transmit beam or the second transmit beam during a second periodic occasion of the third resource set according to the periodicity.

Aspect 23: The method of any of aspects 13 through 22, wherein the network entity comprises a first antenna panel configured to use the first plurality of transmit beams and a second antenna panel configured to use the second plurality of transmit beams, and the user equipment comprises a third antenna panel configured to use the first plurality of receive beams and a fourth antenna panel configured to use the second plurality of receive beams.

Aspect 24: A UE for wireless communications, comprising one or more memories storing processor-executable code, and one or more processors coupled with the one or more memories and individually or collectively operable to execute the code to cause the UE to perform a method of any of aspects 1 through 12.

Aspect 25: A UE for wireless communications, comprising at least one means for performing a method of any of aspects 1 through 12.

Aspect 26: A non-transitory computer-readable medium storing code for wireless communications, the code comprising instructions executable by one or more processors to perform a method of any of aspects 1 through 12.

Aspect 27: A network entity for wireless communications, comprising one or more memories storing processor-executable code, and one or more processors coupled with the one or more memories and individually or collectively operable to execute the code to cause the network entity to perform a method of any of aspects 13 through 23.

Aspect 28: A network entity for wireless communications, comprising at least one means for performing a method of any of aspects 13 through 23.

Aspect 29: A non-transitory computer-readable medium storing code for wireless communications, the code comprising instructions executable by one or more processors to perform a method of any of aspects 13 through 23.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive first signaling indicating a plurality of configurations comprising a first configuration and a second configuration, the first configuration indicating a first resource set that corresponds to a first plurality of transmit beams associated with a network entity and a second resource set that corresponds to a second plurality of transmit beams associated with the network entity, and the second configuration indicating a third resource set;
receive, based at least in part on the first configuration, a first plurality of reference signals using the first resource set and a first plurality of receive beams associated with the UE;
receive, based at least in part on the first configuration, a second plurality of reference signals using the second resource set and a second plurality of receive beams associated with the UE;
transmit a first report indicating a first beam pair and a second beam pair, the first beam pair comprising a first transmit beam of the first plurality of transmit beams and a first receive beam of the first plurality of receive beams and the second beam pair comprising a second transmit beam of the second plurality of transmit beams and a second receive beam of the second plurality of receive beams;
receive, based at least in part on the first report, a third plurality of reference signals using the first receive beam, the second receive beam, and the third resource set; and
transmit a second report comprising a parameter indicative of a correlation between the first beam pair and the second beam pair, the parameter based at least in part on the first report and the third plurality of reference signals.

2. The UE of claim 1, wherein the one or more processors are individually or collectively further operable to execute the code to cause the UE to:
receive, based at least in part on the first report, second signaling indicating one or more values associated with the third resource set, wherein receiving the third plurality of reference signals is based at least in part on the one or more values.

3. The UE of claim 2, wherein the one or more values comprise one or more transmission configuration indication states, a signal to noise ratio value that is based at least in part on the first report, a number of data streams that is based at least in part on the first report, or a combination thereof.

4. The UE of claim 3, wherein the one or more processors are individually or collectively further operable to execute the code to cause the UE to:
measure an effective channel between the UE and the network entity based at least in part on the first report and the third plurality of reference signals; and
determine the parameter based at least in part on the effective channel measurement, the signal to noise ratio value, and the number of data streams.

5. The UE of claim 1, wherein the one or more processors are individually or collectively further operable to execute the code to cause the UE to:
receive, based at least in part on the second report, second signaling indicating for the UE to utilize the first beam pair and the second beam pair for multiple-input multiple-output communications between the UE and the network entity.

6. The UE of claim 5, wherein the second signaling is included in downlink control information.

7. The UE of claim 1, wherein the second configuration further comprises a fourth resource set.

8. The UE of claim 7, wherein the first report further indicates a third beam pair, the third beam pair comprising a third transmit beam of a third plurality of transmit beams and a third receive beam of a third plurality of receive beams, and the one or more processors are individually or collectively further operable to execute the code to cause the UE to:
receive, based at least in part on the first report, a fourth plurality of reference signals using the third receive beam, the fourth resource set, and one of the first receive beam or the second receive beam.

9. The UE of claim 7, wherein the first report further indicates a third beam pair and a fourth beam pair, the third beam pair comprising a third transmit beam of the first plurality of transmit beams and a third receive beam of the first plurality of receive beams and the fourth beam pair comprising a fourth transmit beam of the second plurality of transmit beams and a fourth receive beam of the second plurality of receive beams, and the one or more processors are individually or collectively further operable to execute the code to cause the UE to:

receive, based at least in part on the first report, a fourth plurality of reference signals using the third receive beam, the fourth receive beam, and the fourth resource set, wherein the second report further includes a second parameter indicative of a correlation between the third beam pair and the fourth beam pair, the second parameter based at least in part on the first report and the fourth plurality of reference signals.

10. The UE of claim 1, wherein the second configuration comprises a periodicity associated with the third resource set, and the first report further indicates a third beam pair, the third beam pair comprising a third transmit beam of a third plurality of transmit beams and a third receive beam of a third plurality of receive beams.

11. The UE of claim 10, wherein the UE receives the third plurality of reference signals during a first periodic occasion of the third resource set according to the periodicity, and the one or more processors are individually or collectively further operable to execute the code to cause the UE to:

receive a fourth plurality of reference signals using the third receive beam and one of the first receive beam or the second receive beam during a second periodic occasion of the third resource set according to the periodicity.

12. The UE of claim 1, wherein the network entity comprises a first antenna panel configured to use the first plurality of transmit beams and a second antenna panel configured to use the second plurality of transmit beams, and the user equipment comprises a third antenna panel configured to use the first plurality of receive beams and a fourth antenna panel configured to use the second plurality of receive beams.

13. A network entity, comprising:
one or more memories storing processor-executable code; and
one or more processors coupled with the one or more memories and individually or collectively operable to execute the code to cause the network entity to:
transmit first signaling indicating a plurality of configurations comprising a first configuration and a second configuration, the first configuration indicating a first resource set that corresponds to a first plurality of transmit beams associated with the network entity and a second resource set that corresponds to a second plurality of transmit beams associated with the network entity and the second configuration indicating a third resource set;
transmit, based at least in part on the first configuration, a first plurality of reference signals using the first resource set and the first plurality of transmit beams;
transmit, based at least in part on the first configuration, a second plurality of reference signals using the second resource set and the second plurality of transmit beams;
receive a first report indicating a first beam pair and a second beam pair, the first beam pair comprising a first transmit beam of the first plurality of transmit beams and a first receive beam of a first plurality of receive beams associated with a user equipment (UE) and the second beam pair comprising a second transmit beam of the second plurality of transmit beams and a second receive beam of a second plurality of receive beams associated with the UE;

transmit, based at least in part on the first report, a third plurality of reference signals using the first transmit beam, the second transmit beam, and the third resource set; and
receive a second report comprising a parameter indicative of a correlation between the first beam pair and the second beam pair, the parameter based at least in part on the first report and the third plurality of reference signals.

14. The network entity of claim 13, wherein the one or more processors are individually or collectively further operable to execute the code to cause the network entity to:
transmit, based at least in part on the first report, second signaling indicating one or more values associated with the third resource set, wherein transmitting the third plurality of reference signals is based at least in part on the one or more values.

15. The network entity of claim 14, wherein the one or more values comprise one or more transmission configuration indication states, a signal to noise ratio value that is based at least in part on the first report, a number of data streams that is based at least in part on the first report, or a combination thereof.

16. The network entity of claim 13, wherein the one or more processors are individually or collectively further operable to execute the code to cause the network entity to:
transmit, based at least in part on the second report, second signaling indicating for the UE to utilize the first beam pair and the second beam pair for multiple-input multiple-output communications between the UE and the network entity.

17. The network entity of claim 16, wherein the second signaling is included in downlink control information.

18. The network entity of claim 13, wherein the second configuration further comprises a fourth resource set.

19. The network entity of claim 18, wherein the first report further indicates a third beam pair, the third beam pair comprising a third transmit beam of a third plurality of transmit beams and a third receive beam of a third plurality of receive beams, and the one or more processors are individually or collectively further operable to execute the code to cause the network entity to:
transmit, based at least in part on the first report, a fourth plurality of reference signals using the third transmit beam, the fourth resource set, and one of the first transmit beam or the second transmit beam.

20. The network entity of claim 18, wherein the first report further indicates a third beam pair and a fourth beam pair, the third beam pair comprising a third transmit beam of the first plurality of transmit beams and a third receive beam of the first plurality of receive beams and the fourth beam pair comprising a fourth transmit beam of the second plurality of transmit beams and a fourth receive beam of the second plurality of receive beams, and the one or more processors are individually or collectively further operable to execute the code to cause the network entity to:
transmit, based at least in part on the first report, a fourth plurality of reference signals using the third transmit beam, the fourth transmit beam, and the fourth resource set, wherein the second report further includes a second parameter indicative of a correlation between the third beam pair and the fourth beam pair, the second parameter based at least in part on the first report, and the fourth plurality of reference signals.

21. The network entity of claim 13, wherein the second configuration comprises a periodicity associated with the third resource set, and the first report further indicates a third beam pair, the third beam pair comprising a third transmit beam of a third plurality of transmit beams and a third receive beam of a third plurality of receive beams.

22. The network entity of claim 21, wherein the network entity transmits the third plurality of reference signals during a first periodic occasion of the third resource set according to the periodicity, and the one or more processors are individually or collectively further operable to execute the code to cause the network entity to:
transmit a fourth plurality of reference signals using the third transmit beam and one of the first transmit beam or the second transmit beam during a second periodic occasion of the third resource set according to the periodicity.

23. The network entity of claim 13, wherein the network entity comprises a first antenna panel configured to use the first plurality of transmit beams and a second antenna panel configured to use the second plurality of transmit beams, and the user equipment comprises a third antenna panel configured to use the first plurality of receive beams and a fourth antenna panel configured to use the second plurality of receive beams.

24. A method for wireless communications at a user equipment (UE), comprising:
receiving first signaling indicating a plurality of configurations comprising a first configuration and a second configuration, the first configuration indicating a first resource set that corresponds to a first plurality of transmit beams associated with a network entity and a second resource set that corresponds to a second plurality of transmit beams associated with the network entity, and the second configuration indicating a third resource set;
receiving, based at least in part on the first configuration, a first plurality of reference signals using the first resource set and a first plurality of receive beams associated with the UE;
receiving, based at least in part on the first configuration, a second plurality of reference signals using the second resource set and a second plurality of receive beams associated with the UE;
transmitting a first report indicating a first beam pair and a second beam pair, the first beam pair comprising a first transmit beam of the first plurality of transmit beams and a first receive beam of the first plurality of receive beams and the second beam pair comprising a second transmit beam of the second plurality of transmit beams and a second receive beam of the second plurality of receive beams;
receiving, based at least in part on the first report, a third plurality of reference signals using the first receive beam, the second receive beam, and the third resource set; and
transmitting a second report comprising a parameter indicative of a correlation between the first beam pair and the second beam pair, the parameter based at least in part on the first report and the third plurality of reference signals.

25. The method of claim 24, further comprising:
receiving, based at least in part on the first report, second signaling indicating one or more values associated with the third resource set, wherein receiving the third plurality of reference signals is based at least in part on the one or more values.

26. The method of claim 24, further comprising:
receiving, based at least in part on the second report, second signaling indicating for the UE to utilize the first beam pair and the second beam pair for multiple-input multiple-output communications between the UE and the network entity.

27. The method of claim 24, wherein the network entity comprises a first antenna panel configured to use the first plurality of transmit beams and a second antenna panel configured to use the second plurality of transmit beams, and the user equipment comprises a third antenna panel configured to use the first plurality of receive beams and a fourth antenna panel configured to use the second plurality of receive beams.

28. A method for wireless communications at a network entity, comprising:
transmitting first signaling indicating a plurality of configurations comprising a first configuration and a second configuration, the first configuration indicating a first resource set that corresponds to a first plurality of transmit beams associated with the network entity and a second resource set that corresponds to a second plurality of transmit beams associated with the network entity and the second configuration indicating a third resource set;
transmitting, based at least in part on the first configuration, a first plurality of reference signals using the first resource set and the first plurality of transmit beams;
transmitting, based at least in part on the first configuration, a second plurality of reference signals using the second resource set and the second plurality of transmit beams;
receiving a first report indicating a first beam pair and a second beam pair, the first beam pair comprising a first transmit beam of the first plurality of transmit beams and a first receive beam of a first plurality of receive beams associated with a user equipment (UE) and the second beam pair comprising a second transmit beam of the second plurality of transmit beams and a second receive beam of a second plurality of receive beams associated with the UE;
transmitting, based at least in part on the first report, a third plurality of reference signals using the first transmit beam, the second transmit beam, and the third resource set; and
receiving a second report comprising a parameter indicative of a correlation between the first beam pair and the second beam pair, the parameter based at least in part on the first report and the third plurality of reference signals.

29. The method of claim 28, further comprising:
transmitting, based at least in part on the first report, second signaling indicating one or more values associated with the third resource set, wherein transmitting the third plurality of reference signals is based at least in part on the one or more values.

30. The method of claim 28, further comprising:
transmitting, based at least in part on the second report, second signaling indicating for the UE to utilize the first beam pair and the second beam pair for multiple-input multiple-output communications between the UE and the network entity.

* * * * *